(12) United States Patent
Yi

(10) Patent No.: US 11,880,921 B2
(45) Date of Patent: Jan. 23, 2024

(54) SYSTEM AND METHOD FOR MULTIMEDIA PRESENTATION

(71) Applicant: Cobalt Inc., Seoul (KR)

(72) Inventor: Haeil Yi, Seoul (KR)

(73) Assignee: Cobalt Inc., Seoul (KR)

( * ) Notice: Subject to any disclaimer, the term of this patent is extended or adjusted under 35 U.S.C. 154(b) by 0 days.

(21) Appl. No.: 18/107,238

(22) Filed: Feb. 8, 2023

(65) Prior Publication Data

US 2023/0237720 A1 Jul. 27, 2023

Related U.S. Application Data

(63) Continuation of application No. PCT/US2023/011627, filed on Jan. 26, 2023.

(30) Foreign Application Priority Data

Jan. 27, 2022 (KR) .................. 10-2022-0012107
Jan. 27, 2022 (KR) .................. 10-2022-0012108
Jan. 27, 2022 (KR) .................. 10-2022-0012109
Jan. 27, 2022 (KR) .................. 10-2022-0012110
Jan. 27, 2022 (KR) .................. 10-2022-0012111
(Continued)

(51) Int. Cl.
*G06T 11/60* (2006.01)
*H04N 5/91* (2006.01)

(52) U.S. Cl.
CPC .............. *G06T 11/60* (2013.01); *H04N 5/91* (2013.01)

(58) Field of Classification Search
CPC .................................. G06T 11/60; H04N 5/91
See application file for complete search history.

(56) References Cited

U.S. PATENT DOCUMENTS 6,665,835 B1 * 12/2003 Gutfreund ............... G06F 16/40
715/202
8,074,251 B2 12/2011 Aoki et al.
(Continued)

FOREIGN PATENT DOCUMENTS

WO 2014031699 A1 2/2014

OTHER PUBLICATIONS

Harald Sack et al., Automated Annotation of Synchronized Multimedia Presentations, Friedrich-Schiller-Universitat Jena, GERMANY, 2006.
(Continued)

*Primary Examiner* — Anil K Bhargava
(74) *Attorney, Agent, or Firm* — K&L Gates LLP

(57) ABSTRACT

Systems and methods are disclosed for generating, transmitting, reproducing, and integrating multimedia contents for a presentation. An example method includes providing a presentation document comprising a plurality of slides (e.g., a first slide and a second slide), and generating multimedia data of a presentation, including a first audio datum, a first video datum, a second audio datum and a second video datum. The multimedia data may be transmitted to an audience device for reproduction of the multimedia presentation such that: each of the first audio datum, the first video datum, the second audio datum and the second video datum is individually transmitted to the audience device, along with slide information indicative of one of the plurality of slides with which it is associated and time information indicative of a time at which each multimedia datum is to be played back.

20 Claims, 10 Drawing Sheets

(30) Foreign Application Priority Data

| Jan. 27, 2022 | (KR) | 10-2022-0012113 |
|---|---|---|
| Jan. 27, 2022 | (KR) | 10-2022-0012114 |
| Jan. 27, 2022 | (KR) | 10-2022-0012115 |
| Jan. 27, 2022 | (KR) | 10-2022-0012116 |

(56) References Cited

U.S. PATENT DOCUMENTS

| 8,381,086 | B2* | 2/2013 | Li | H04N 21/4341 |
| | | | | 715/201 |
| 8,665,320 | B2 | 3/2014 | Holley | |
| 9,319,448 | B2 | 4/2016 | Chen et al. | |
| 11,200,600 | B2 | 12/2021 | Miller et al. | |
| 2002/0036694 | A1 | 3/2002 | Merril | |
| 2002/0120939 | A1 | 8/2002 | Wall et al. | |
| 2006/0288389 | A1* | 12/2006 | Deutscher | H04N 21/4828 |
| | | | | 725/100 |
| 2008/0120546 | A1* | 5/2008 | Pulier | G11B 27/034 |
| 2008/0288890 | A1* | 11/2008 | Anderson | H04N 21/2743 |
| | | | | 715/810 |
| 2009/0077460 | A1* | 3/2009 | Li | H04N 21/482 |
| | | | | 715/203 |
| 2009/0157205 | A1 | 6/2009 | Inoue et al. | |
| 2011/0107214 | A1* | 5/2011 | Kouznetsov | G11B 27/10 |
| | | | | 715/716 |
| 2017/0003828 | A1* | 1/2017 | Gorman | H04N 21/43072 |

OTHER PUBLICATIONS

Internaitonal Search Report dated May 10, 2023 in International Application No. PCT/US23/11627.

\* cited by examiner

SYSTEM AND METHOD FOR MULTIMEDIA PRESENTATION

INCORPORATION BY REFERENCE TO ANY PRIORITY APPLICATIONS

Any and all applications for which a priority claim is made in the Application Data Sheet are hereby incorporated by reference in their entirety.

BACKGROUND

Multimedia contents of a presentation typically includes a presentation document (e.g., ppt doc.), audio (e.g., featuring the presenter's voice), video (e.g., featuring the presenter), and markings (e.g., annotations) made by the presenter on the presentation document. Typically, visual contents of the presentation document, such as video and marking, are combined together to form image frames which are transmitted to audience devices for reproduction. Once combined in the form of image frames, the components are not separable in their original forms. Generally, the size of the combined image frames is relatively large even if compressed. Effective distribution of multimedia presentation contents may be difficult or limited in the areas where the data transmission infrastructure is not very good.

Various embodiments are presented herein that address one or more of these shortcomings.

SUMMARY

The present disclosure provides new and innovative systems and methods for generating, transmitting, reproducing, and integrating multimedia contents for a presentation. In an example, a method of processing a multimedia presentation is disclosed. The method may be performed by a computing device having one or more processors. The method may include providing a presentation document comprising a plurality of slides. The plurality of slides may include, for example, a first slide and a second slide. The method may further include generating multimedia data of a presentation. The presentation may be performed by at least one presenter using the presentation document. The multimedia data may include audio and video data, for example, a first audio datum, a first video datum, a second audio datum and a second video datum. The first audio datum may be associated with the first slide and configured for reproducing a first audio captured while the first slide is displayed during the presentation. The first video datum may be associated with the first slide and configured for reproducing a first video captured while the first slide is displayed during the presentation. The second audio datum may be associated with the second slide and configured for reproducing a second audio captured while the second slide is displayed during the presentation. The second video datum may be associated with the second slide and configured for reproducing a second video captured while the second slide is displayed during the presentation.

The method may further include causing to transmit the multimedia data to an audience device for reproduction of the multimedia presentation such that: each of the first audio datum, the first video datum, the second audio datum and the second video datum is individually transmitted to the audience device, each of the first audio datum, the first video datum, the second audio datum and the second video datum is transmitted along with slide information indicative of one of the plurality of slides with which it is associated, the first video datum, when transmitted, is not combined or integrated with the first slide, the second video datum, when transmitted, is not combined or integrated with the second slide, the first video datum is transmitted along with first video time information indicative of a time at which the first video datum is to be played back, and the second video datum is transmitted along with second video time information indicative of a time at which the second video datum is to be played back.

In some aspects, the method may further include: causing to synchronize playing of the first audio datum and displaying of the first slide such that the first slide appears on a screen of the audience device or another device as the first audio datum starts to be played back; and causing to synchronize playing of the second audio datum and displaying of the second slide such that the second slide appears on the screen as the second audio datum starts to be played back.

In some aspects, the method may further include causing at least part of the plurality of slides comprising the first and second slides to be transmitted to the audience device prior to transmission of the multimedia data to the audience device; causing to load the at least part of the plurality of slides on a viewing computer program installed in the audience device for viewing the at least part of the plurality of slides prior to receipt of the first audio datum on the audience datum; and causing to synchronize playing of the first audio datum and displaying of the first slide such that the first slide appears on a screen of the audience device or another device as the first audio datum starts to be played back.

In some aspects, the second slide is immediately subsequent to the first slide in the presentation. The method may further include causing to transmit the first slide to the audience device; and subsequently causing to transmit the second slide to the audience device, wherein the first audio datum and the first video datum are transmitted to the audience device prior to transmission of the second slide.

In some aspects, the second slide may be immediately subsequent to the first slide in the presentation. The second audio datum may be transmitted to the audience device along with a second audio time information indicative of a time at which the second audio datum is to be played back. Furthermore, the time indicated by the second audio time information may be at or about a time at which playing of the first audio datum is completed.

In some aspects, the method may further include causing to synchronize playing of the first audio datum and displaying of the first slide such that the first slide appears on a screen of the audience device or another device as the first audio datum starts to be played back; and causing to synchronize playing of the second audio datum and displaying of the second slide such that the first slide is switched to the second slide on the screen as the second audio datum starts to be played back.

In some aspects, the method may further include causing to start playing the first video datum at the time indicated by the first video time information while the first slide is being displayed on the screen such that a first video of the first video datum is displayed on the screen together with the first slide; and causing to start playing the second video datum at the time indicated by the second video time information while the second slide is being displayed on the screen such that a second video of the second video datum is displayed on the screen together with the second slide.

In some aspects, the first video datum may be referred to as a first video datum configured for reproducing a video captured while the first slide is displayed during the presentation. The second video datum may be referred to as a second video datum configured for reproducing a video captured while the second slide is displayed during the presentation. The multimedia data may further include a first marking datum and a second marking datum. The first marking datum is associated with the first slide as containing at least one marking made on the first slide while the first slide is displayed during the presentation. Furthermore, the second marking datum may be associated with the second slide as containing at least one marking made on the second slide while the second slide is displayed during the presentation.

In some aspects, each of the first marking datum and the second marking datum is individually transmitted to the audience device. Each of the first marking datum and the second marking datum may be transmitted along with slide information indicative of one of the plurality of slides with which it is associated. The first marking datum, when transmitted, may not be combined or integrated with the first slide. The second marking datum, when transmitted, may not be combined or integrated with the second slide. The first marking datum may be transmitted along with first marking time information indicative of a time at which the first marking datum is to be played back. Furthermore, the second marking datum may be transmitted along with second marking time information indicative of a time at which the second marking datum is to be played back.

In some aspects, the first video datum may be referred to as a first marking datum configured for reproducing at least one marking made on the first slide while the first slide is displayed during the presentation. The second video datum may be referred to as a second marking datum configured for reproducing at least one marking made on the second slide while the second slide is displayed during the presentation. Furthermore, the first marking datum may include location information indicative of a location of a marking on the first slide and a time associated with the location.

In some aspects, the first marking datum may include thickness information indicative of a thickness of the marking and color information indicative of a color of the marking.

In some aspects, generating the multimedia data may include: capturing an audio during the presentation, in which the first slide is displayed and subsequently the first slide is replaced with the second slide; detecting a slide change in which the first slide is replaced with the second slide; creating the first audio datum using a first portion of the audio (the first audio) that ends at or about the slide change; and creating the second audio datum using a second portion of the audio (the second audio) that starts at or about the of the slide change.

In some aspects, the audio is provided by capturing the audio during the presentation. Moreover, the slide change may be detected and the first audio may be created while the presentation is being performed. Furthermore, the slide change can be detected based on an input by the at least one presenter or based on monitoring of displayed slides while the presentation is being performed. The first audio datum may be transmitted to the audience device by streaming while the presentation is being performed.

In some aspects, the multimedia data may be generated by: capturing an audio during the presentation, in which the first slide is displayed and subsequently the first slide is replaced with the second slide; detecting an addition of the first video occurred while the first slide is displayed during the presentation; creating the first video datum comprising the first video; and further creating the first video time information indicative of a time at or about which the first video is added.

In some aspects, the multimedia data may be generated by: providing at least one recording of the audio of the presentation, in which the first slide is displayed and subsequently the first slide is replaced with the second slide; providing at least one recording of a visual representation of the presentation which comprises a sequence of at least part of the plurality of slides; processing the visual representation of the presentation to detecting a slide change in which the first slide is replaced with the second slide; determining a time of the slide change relative to a reference point in the audio of the presentation; creating the first audio datum using a portion of the audio (the first audio) that ends at or about the time of the slide change; and creating the second audio datum using a portion of the audio (the second audio) that starts at or about the time of the of the slide change.

In an embodiment, a method for reproducing a multimedia presentation is disclosed. The method may be performed by a computing device (e.g., an audience device) having a memory and one or more processors. The method may include receiving a presentation document comprising a plurality of slides, including a first slide and a second slide; and receiving a first audio datum, a first video datum, a second audio datum and a second video datum individually and separately from the presentation document. Along with each of the first audio datum, the first video datum, the second audio datum and the second video datum, the computing device may receive slide information indicative of one of the plurality of slides with which it is associated. Along with the first video datum, the computing device may further receive first video time information indicative of a time at which the first video datum is to be played back. Furthermore, along with the second video datum, the computing device may further receive second video time information indicative of a time at which the second video datum is to be played back.

The method may further include playing a first audio of the first audio datum while displaying the first slide on a screen. Along with the first slide on the screen, the computing device may display a first video of the first video datum at or about the time indicated in the first video time information. Upon completion of playing of the first audio, the computing device may immediately play a second audio of the second audio datum. The computing device may display the second slide in replacement of the first slide on the screen as playing of the second audio. Furthermore, along with the second slide on the screen, the computing device may display a second video of the second video datum at or about the time indicated in the second video time information.

In some aspects, the method may further include loading the at least the part of the presentation document on a viewing computer program for viewing the at least the part of the presentation document prior to receiving the multimedia data comprising the first audio datum, the first video datum, the second audio datum, and the second video datum. The method may further include synchronizing playing of the first audio of the first audio datum and displaying the first slide such that the first slide appears on the screen as the first audio datum starts to be played back.

In some aspects, the method may further include identifying, based on the slide information, associations between: the first audio datum and the first slide, the first video datum and the first slide, the second audio datum and the second slide, and the second video datum and the second slide;

determining, based on the first video time information, the time at which the first video datum is to be played back; and determining, based on the first second time information, the time at which the first video datum is to be played back. In some aspects, the presentation document, the first audio datum, the first video datum, the second audio datum, and the second video datum may be stored within a database.

In some aspects, the received multimedia data may further comprise a first marking datum and a second marking datum. The first marking datum may be associated with the first slide, and the second marking datum may be associated with the second slide. The method may further include: along with the first marking datum, further receiving first marking time information indicative of a time at which the first marking datum is to be displayed as a first marking on the first slide; along with the first slide on the screen, further displaying the first marking of the first marking datum at or about the time indicated in the first marking time information; along with the second marking datum, further receiving second marking time information indicative of a time at which the second marking datum is to be displayed as a second marking on the second slide; and along with the second slide on the screen, further displaying the second marking of the second marking datum at or about the time indicated in the second marking time information.

In an example, a system for processing a multimedia presentation is disclosed. The system may include memory and one or more processors in communication with the memory. The memory may store instructions that, when executed by the one or more processors, may cause the one or more processors to perform one or more of the following steps: providing a presentation document comprising a plurality of slides which comprises a first slide and a second slide; generating multimedia data of a presentation performed by at least one presenter using the presentation document, wherein the multimedia data comprises a first audio datum, a first video datum, a second audio datum and a second video datum; wherein the first audio datum is associated with the first slide and configured for reproducing a first audio captured while the first slide is displayed during the presentation, the first video datum is associated with the first slide and configured for reproducing a first video captured while the first slide is displayed during the presentation, the second audio datum is associated with the second slide and configured for reproducing a second audio captured while the second slide is displayed during the presentation, and the second video datum is associated with the second slide and configured for reproducing a second video captured while the second slide is displayed during the presentation; and causing to transmit the multimedia data to an audience device for reproduction of the multimedia presentation such that: each of the first audio datum, the first video datum, the second audio datum and the second video datum is individually transmitted to the audience device, each of the first audio datum, the first video datum, the second audio datum and the second video datum is transmitted along with slide information indicative of one of the plurality of slides with which it is associated, the first video datum, when transmitted, is not combined or integrated with the first slide, the second video datum, when transmitted, is not combined or integrated with the second slide, the first video datum is transmitted along with first video time information indicative of a time at which the first video datum is to be played back, and the second video datum is transmitted along with second video time information indicative of a time at which the second video datum is to be played back.

In another embodiment a system for reproducing a multimedia presentation is disclosed. The system may include memory and one or more processors in communication with the memory. The memory may store instructions that, when executed by the one or more processors, may cause the one or more processors to perform one or more of the following steps: receiving a presentation document comprising a plurality of slides which comprises a first slide and a second slide; receiving a first audio datum, a first video datum, a second audio datum and a second video datum individually and separately from the presentation document; along with each of the first audio datum, the first video datum, the second audio datum and the second video datum, further receiving slide information indicative of one of the plurality of slides with which it is associated; along with the first video datum, further receiving first video time information indicative of a time at which the first video datum is to be played back; along with the second video datum, further receiving second video time information indicative of a time at which the second video datum is to be played back; playing a first audio of the first audio datum while displaying the first slide on a screen; along with the first slide on the screen displaying a first video of the first video datum at or about the time indicated in the first video time information; upon completion of playing of the first audio, immediately playing a second audio of the second audio datum; displaying the second slide in replacement of the first slide on the screen as playing of the second audio; and along with the second slide on the screen displaying a second video of the second video datum at or about the time indicated in the second video time information.

In an example, a non-transitory computer-readable medium for use on a computer system is disclosed. The non-transitory computer-readable medium may contain computer-executable programming instructions may cause processors to perform one or more methods or steps described herein.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
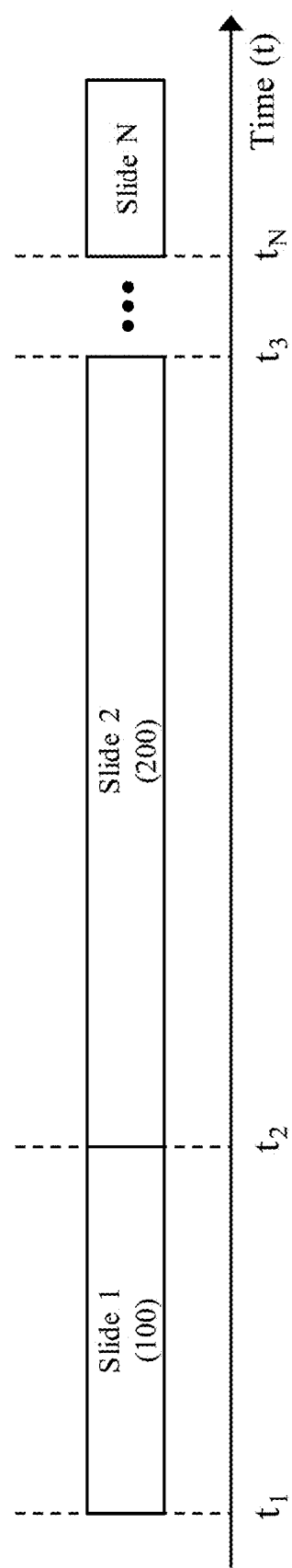
FIG. 1 illustrates a presentation timeline for a presentation of a presentation document comprising a plurality of slides according to an example embodiment of the present disclosure.

The presently disclosed subject matter now will be described and discussed in more detail in terms of some specific embodiments and examples with reference to the accompanying drawings, in which some, but not all embodiments of the invention are shown. Like numbers refer to like elements or parts throughout. The presently disclosed subject matter may be embodied in many different forms and should not be construed as limited to the specific embodiments set forth herein. Rather, these embodiments are provided so that this disclosure will satisfy applicable legal requirements. Indeed many modifications and other embodiments of the presently disclosed subject matter will come to the mind of one skilled in the art to which the presently disclosed subject matter pertains. Therefore, it is to be understood that the presently disclosed subject matter is not to be limited to the specific embodiments disclosed and that modifications and other embodiments are intended to be included within the scope of the appended claims.

Current Issues in the Distribution of Presentations with Multimedia Content

A presentation often involves a presenter communicating to their audience through multimedia contents, which typically includes a presentation document (e.g., ppt doc.), audio, video, and markings made by the presenter on the presentation document. Typically, visual contents of the presentation document, video and markings (e.g., notes or annotations added to the presentation document) are combined together to form image frames that get transmitted to audience devices for reproduction. Once combined in the form of image frames, the components are not separable in their original forms. Generally, the size of the combined image frames is relatively large even if they are compressed. Effective distribution of multimedia presentation contents may be difficult or limited in the areas where the data transmission infrastructure is not very good. Even if an audio for the presentation were to be separately delivered or streamed, similar networking constraints may result in lag time or may lack synchronization. Therefore, there is a desire and need for a more effective system and method for generating, delivering, and reproducing presentations with multiple forms of multimedia content (referred to herein as multimedia presentations), so that the multimedia presentations can withstand hardware and networking constraints and be easily separable into its respective components.

Overview of a Non-Limiting Example of Addressing the Above Described Issues

Various embodiments of the present disclosure address one or more of the above described shortcomings. In at least some embodiments, the present disclosure provides a system and method for generating and transmitting multimedia contents for a presentation, which include the presentation document, audio data, video data, and markings data, from a computing system or device associated with the presenter (referred to herein as the "presenter device") to a computing system or device associated with the intended recipient or audience (referred to herein as the "audience device") for integration and reproduction thereon. Each of the audio, video, and markings data may be segmented into smaller pieces (e.g., chunks) and may be transmitted piecemeal as opposed to transmitting the entire audio, video or markings for the entire presentation together. Each piece being transmitted—for example, each audio datum, each video datum and/or each markings datum—may be generated for the transmission and associated (e.g., via metadata) with a particular slide of the presentation material. Furthermore, some pieces being transmitted, for example, the markings datum or video datum associated with a particular slide, may be transmitted with time information indicative of when they are to be presented. In some embodiments, another computing system or device (e.g., a server) may facilitate the transmission of the presentation to the audience device by receiving the live or recorded presentation from the presenter device, generating the multimedia content associated with the presentation, and causing the separate transmission of the individual pieces of the presentation to the audience device, along with the time information and slide information for the various individual pieces. In another embodiment of the present disclosure, systems and methods are disclosed by which an audience device integrates or assembles (e.g., via computer executable instructions) the presentation document, audio datum, video datum and markings datum to reproduce the presentation.

A Non-Limiting Example of Generating a Presentation

As an example, a presenter may use their presenter device to record a presentation on a desired topic. The presenter may record various aspects of the presentation as part of a process for creating the presentation before the presenter actually presents or distributes the presentation to an audience. Also or alternatively, the various components of the presentation may be captured or recorded while the presenter is presenting (e.g., during a live meeting (e.g., a ZOOM call)), and the various components of the presentation may be distributed to the audience device of the audience in real-time at predefined intervals, as will be described herein. The presenter may utilize a presentation document that comprises a plurality of slides. Each slide may correspond to and outline subtopics of the presentation and may be displayed in a form that facilitates retention of information by an audience (e.g., bullet points, graphs, etc.). The presenter may have the presentation document saved in their presentation device. As the presenter switChes from one slide to another slide on the presentation document, the change in the slides can be detected (e.g., by the presenter device or another device (e.g., a server)) and that detection (referred to herein as "slide detection") can be used to determine the sequence of slides, the time points at which slides are replaced (e.g., by subsequent slides), and durations of time at which each slide is shown. While presenting, the presenter's voice narrating the presentation may be captured by the presenter device or another computing device (e.g., via a microphone). The captured audio may be stored, along with information about the respective slides to which the captured audio pertains (slide information for the audio) and information pertaining to the starting and ending times in the presentation when the audio occurs (time information for the audio). The presenter may choose to focus the presentation on themselves (e.g., via a camera) such that an audience would see a video of the presenter (e.g., in addition to the slide). The captured video may be stored, along with information about the respective slides to which the captured video pertains to (slide information for the video) and information pertaining to the starting and ending times in the presentation when the video occurs (time information for the video). The presenter may also choose to annotate the slides (e.g., underlining, circling, drawing an arrow to emphasize a point, etc.), for example, using a pen or other marking tool provided via a presentation software (e.g., Microsoft PowerPoint). The annotations (referred to as markings) may be captured and stored along with information pertaining to their association with the respective slides being annotated (slide information for the markings) and information pertaining to the starting and ending times in the presentation when those markings occur (time information for the markings).

Slide of Presentation Document

In embodiments, a slide of the presentation document may be a static image or page to be displayed during the presentation. A slide of the presentation document may include one or more dynamic elements (e.g., animations or effects in in Microsoft PowerPoint). A static presentation slide may corresponds to a page in a printed or printable handout for the presentation.

A Non-Limiting Example of Transmitting the Presentation to an Audience Device for Reproduction Thereon The presenter may desire to distribute the presentation to an audience. For example, if the presenter was delivering a live presentation to the audience (e.g., a ZOOM call), the audience may desire to obtain a copy of the presentation to replay at their leisure. Also or alternatively, the presenter may desire to submit the presentation to an audience that may not have seen or heard the presentation yet. As previously described, various components of the presentation (e.g., the slides, the audio, video, markings, etc.) that the presenter had prepared, or was delivering in real-time, may be separately captured and stored as individual multimedia datum (e.g., slide datum, audio datum, video datum, marking datum, etc.). Each individual multimedia datum, which may further include slide information and time information, may be separately transmitted to an audience device of the audience. Furthermore, the separate components may be transmitted in chunks that correspond to predefined presentation intervals. For example, in embodiments where the presenter is presenting to an audience in real-time (e.g., a ZOOM call), the presenter device or another device (e.g., a server) may transmit the separate components for a given presentation interval as soon as the presentation interval ends, before the presentation proceeds to the next presentation interval. In some aspects, the presentation intervals may correspond to the duration of time provided for each slide in the presentation. In such aspects, presentation intervals may be set based on the detections of slide changes by the presentation device or another device (e.g., server) while the presenter is presenting. However, presentation intervals may be additionally or alternatively based on other factors (e.g., predetermined time intervals (e.g., every 10 minutes), segments of audio or other multimedia content during the presentation). The slide data for a given slide, and any audio data corresponding to the slide, any video data corresponding to the slide, and/or any marking data corresponding to the slide may be separately transmitted to the audience device before slide data and any associated multimedia data for the next slide is transmitted. In some aspects, the presentation document itself may be transmitted to the audience device prior to any multimedia data associated with any given slide is transmitted to the audience device. Thus, the intended audience may efficiently receive presentations as they are prepared or delivered (e.g., slide by slide, or at each presentation intervals) and as separate multimedia content so that the audience can fully experience the multimedia presentation (e.g., without compromising on quality).

A Non-Limiting Example of Reproducing the Presentation at an Audience Device

As discussed, each piece of multimedia data (corresponding to a given slide and/or a given presentation interval) may include information (e.g., metadata) about the slide with which the piece of multimedia data is associated with (slide information), and may, in some aspects, may further include information about a start and end time for that piece of multimedia data (time information). The slide information and time information for each piece of multimedia data allows the audience device to assemble and recreate the presentation. For example, as each slide data is received, the audience device may identify any subsequently received multimedia data as belonging to that slide (e.g., based on the slide information for the multimedia data), and may use the time information for that multimedia data to determine at what time point the multimedia data is to be played back. Thus, an audience listening and viewing the presenter's presentation may be able to simultaneously (e.g., in real-time), and/or at any time point after a live presentation, receive components and pieces of the presentation on their audience device to efficiently reassemble the presentation. Moreover, the transmission of individual components and pieces of a multimedia presentation in accordance with the segmentation techniques described herein overcomes bandwidth, lag time, and file size issues that are prevalent in conventional modes of multimedia presentation distribution. Furthermore, the inclusion of critical assembly information within each transmitted multimedia datum allows the audience to experience the presentation without compromising on any aspects of the presentation during its recreation.

Presentation Timeline for a Presentation Document

Presentations delivered across devices have typically involved presentation documents (e.g., PowerPoint files) featuring a plurality of slides. A presentation may occur over a duration of time, and may involve a temporal component for each slide throughout the duration of the presentation. FIG. 1 illustrates a presentation timeline for a presentation of a presentation document comprising a plurality of slides according to an example embodiment of the present disclosure. For example, the presentation is shown to span a duration of time that is at least $t_n$. The presentation document is shown to comprise a plurality of slides, from slide 1 (100), to slide 2 (200), and all the way to slide N. During the duration of the presentation, the display of each slide may begin at a specific time of the presentation, and may be displayed until the specified time for the next slide to be displayed. Thus, as shown in FIG. 1, slide 1 (100) is displayed from $t_1$ to $t_2$, slide 2 (200) is displayed from $t_2$ until $t_3$, and slide N is displayed at least from $t_N$ (the end time for displaying slide N is not shown but slide N is indicated as being the end of the presentation document). In some embodiments, the end time for the display of a given slide need not coincide with the start time for the display of the subsequent slide. Furthermore the duration of time for which a given slide is displayed need not be the same as the duration of time for which another slide is displayed. For example, slide 2 (200) is displayed for a longer time ($t_2$ to $t_3$) than the duration of time during which slide 1 (100) is displayed ($t_1$ to $t_2$), as shown by the lengths of the portions of the timeline provided for each slide in FIG. 1.

Presentation Timeline for Presentations with Additional Multimedia Content

Figure 2A:
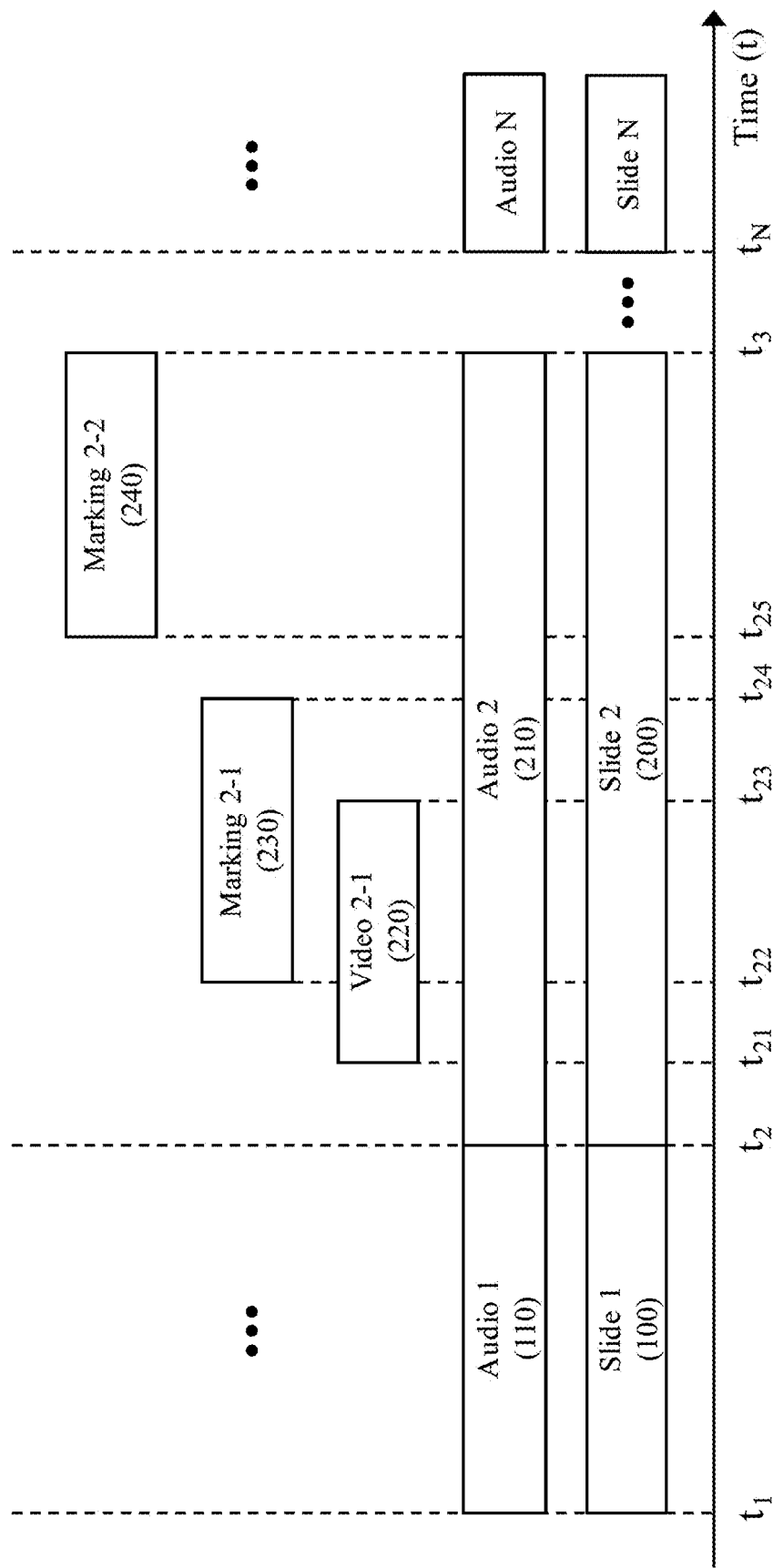
FIG. 2A illustrates a presentation timeline for a presentation of a presentation document and additional multimedia content according to an example embodiment of the present disclosure.

Although presentations delivered across devices have typically included presentation documents, presentations have often further included additional multimedia content such as videos, audio, and markings (e.g., on the slides). The additional multimedia content may accompany the presentation document so that they may both be presented, such that their presentations can result in specific overlapping timeframes. FIG. 2A illustrates a presentation timeline for a presentation of a presentation document and additional multimedia content according to an example embodiment of the present disclosure. As shown in FIG. 2A, along with the presentation of the presentation document comprising the plurality of slides (e.g., Slide 1(100), Slide 2 (200), ... Slide N), the presentation also includes audio, video, and markings (e.g., annotations in the presentation document made by the presenter). The audio may be segmented to a plurality of audio segments occurring throughout the presentation, such as audio 1 (110), to audio 2 (210), and all the way to audio N, as shown. In the example shown in FIG. 2A, the start and end time of each audio segment coincides with the start and end time of each respective slide. That is, audio 1 (110) and slide (100) both begin at $t_1$ and end at $t_2$, slide 2 (200) and audio 2 (210) both begin at $t_2$ and end at $t_3$, and audio N and slide N both begin at $t_N$. However, consecutive segments of different multimedia content need not align along the same start and end times. For example, video 2-1 (220) is shown to begin at $t_{21}$ and end at $t_{23}$, which is only a portion of the timespan when audio 2 and slide 2 (200) are being presented. Similarly, in the example presentation shown in FIG. 2A, there are two markings, marking 2-1 (230) and marking 2-2 (240). However, while both of these markings occur between the start and end times of audio 2 (210) and slide 2 (200) of $t_1$ and $t_2$, the start and end times of marking 2-1 (230) is $t_{22}$ and $t_{24}$, respectively (i.e., starting and ending later than video 2-1 (220)), and the start and end time of marking 2-2 (240) is $t_{25}$ and $t_3$, respectively. As used herein, a marking may refer to visual annotations added to a slide or portion of the presentation document for a duration of time.

Figure 2B:
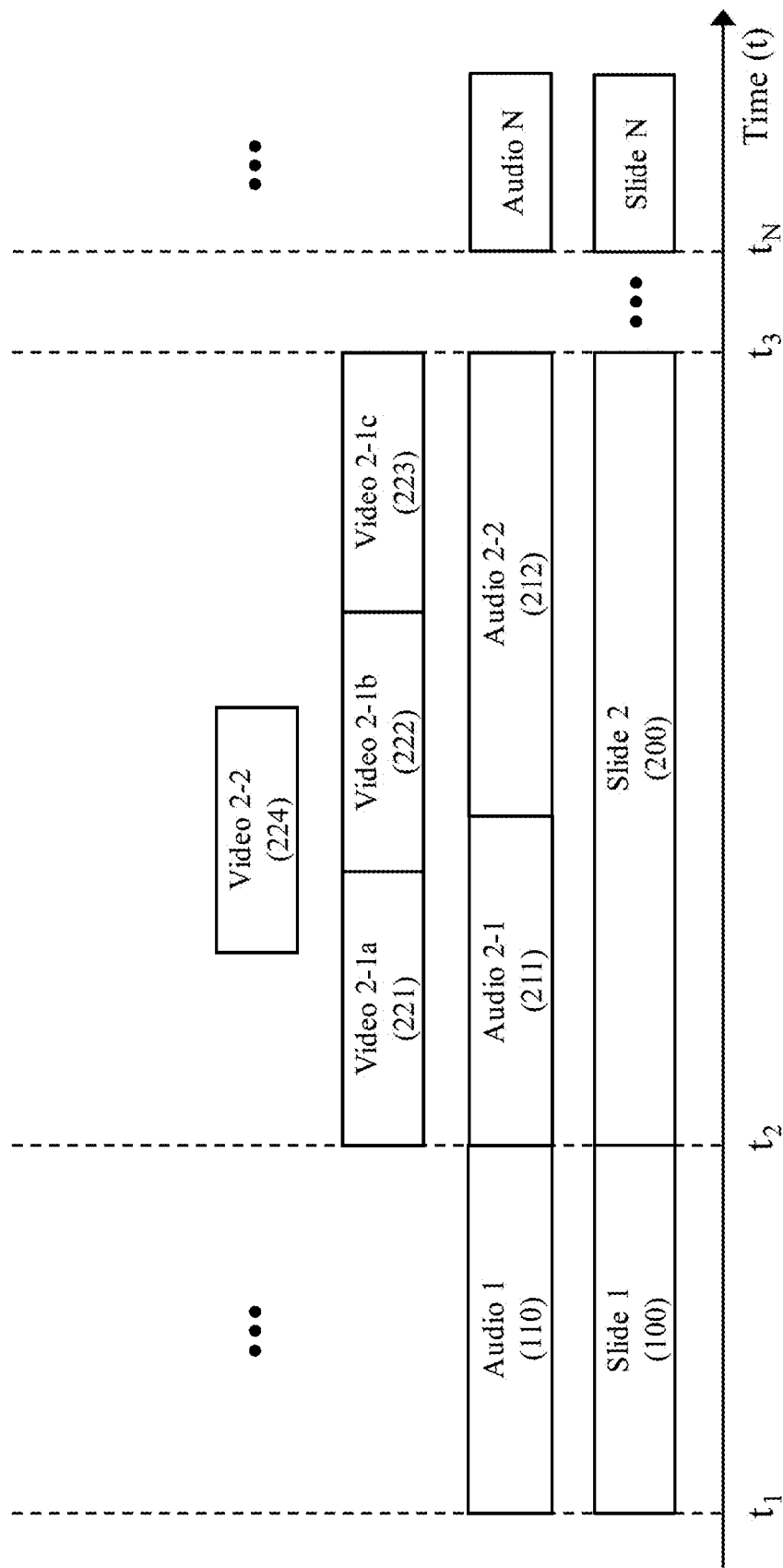
FIG. 2B illustrates another presentation timeline for a presentation of a presentation document and additional multimedia content according to an example embodiment of the present disclosure.

FIG. 2B illustrates another presentation timeline for a presentation of a presentation document and additional multimedia content according to an example embodiment of the present disclosure. In the example shown in FIG. 2B, in contrast to the example shown in FIG. 2A, the presentation timeline includes audio content whose start and end times are not aligned with the start and end times of each slide. For example, when slide 2 (200) is being presented from $t_2$ until $t_3$, audio 2-1 starts to be played at $t_2$ but ends earlier than $t_3$. Another audio, audio 2-2 (212), is played immediately after audio 2-1 ends, until $t_3$. The audio data corresponding to audio 2-1 and audio 2-2 may include time information indicating the start and end times of the respective audio content, in order to facilitate proper playback of the audio at the correct times during the presentation wherever the presentation is reproduced. Furthermore, in some embodiments, there may be two different multimedia content of the same type of multimedia content that can be played concurrently during the display of a slide. For example, as shown in the second presentation interval ($t_2$ to $t_3$) of FIG. 2B, video 2-1a (221) and video 2-1b (222) are played consecutively after one another, while video 2-2 (224) is also being played. After video 2-2 (224) ends, video 2-1c (223) is played until $t_3$ (the end time for the display of slide 2 (200). However, when video 2-1c begins to be played, video 2-2 (224) had already ended. Embodiments described herein allow for the distribution of individual and separate components of the presentation, such as video-2-1a (221), video-2-1b (222), video-2-1c (223), video-2-2 (224), and allow for the effective reproduction of the presentation at an audience device, by including critical time information and/or slide information for each component of the presentation.

Figure 3:
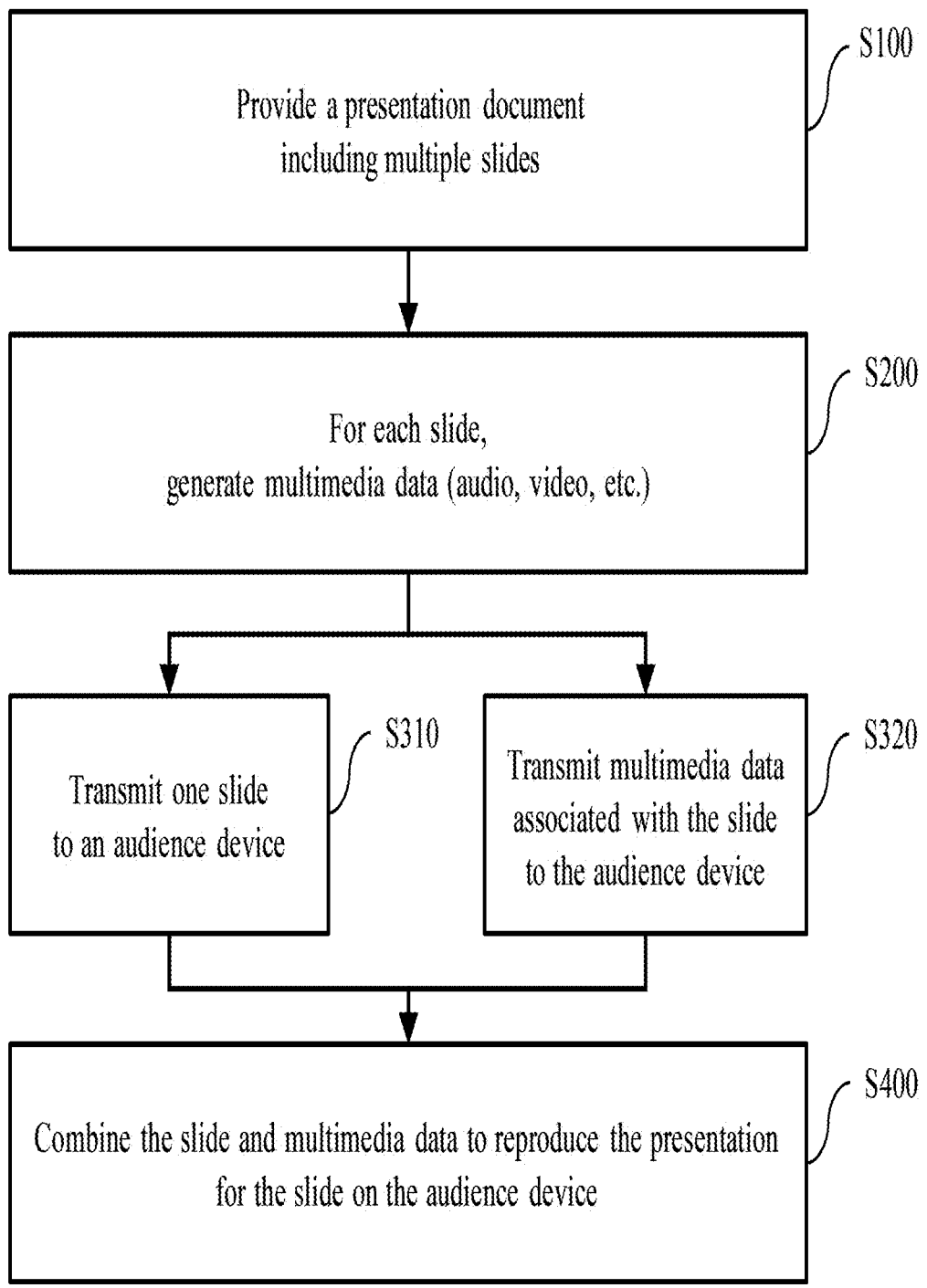
FIG. 3 is a flow chart illustrating a process for generating, transmitting, reproducing, and integrating multimedia contents for a presentation, according to an example embodiment of the present disclosure.

Example Process for Generating, Transmitting, Reproducing, and Integrating Multimedia Contents for a Presentation As previously discussed, conventional methods of distributing presentations involve combining the various multimedia components described above such that they are not separable in their original forms, resulting in the aforementioned size and bandwidth issues. FIG. 3 is a flow chart illustrating a process for generating, transmitting, reproducing, and integrating multimedia contents for a presentation, according to an example embodiment of the present disclosure. It is contemplated that in order to avail the techniques described herein to overcome the shortcomings of conventional methods for distributing presentations with multimedia content, the presentation is first created by a presenter. Thus, at step S100, a presentation may be initiated by generating or receiving a presentation document comprising a plurality of slides. For example, a presenter may draft slides for the presentation document using one or more software tools (e.g., Microsoft PowerPoint) at a computing device associated with the presenter (presenter device). Also or alternatively, a computing device or system (e.g., a server) may receive a presentation document (e.g., from the presenter device), and the computing device or system (e.g., the server) may then proceed to perform one or more steps presented herein for generating multimedia data and distributing the presentation. In various embodiments, the presentation may be initiated by combining the drafted slides into a single file and/or causing the drafted slides to be saved as a file (e.g., a .PPT file), such that the slides are arranged sequentially (e.g., each slide has an order of entry in the presentation). The combined slides may comprise a slideshow. In some embodiments, the presenter may specify a duration of time for the presentation (e.g., a duration of time for the slideshow), and may specify a duration of time that each slide of the presentation is to be displayed during the presentation.

Generating Multimedia Data

At step S200, multimedia data (e.g., audio, video, marking data, etc.) is generated for each slide. The multimedia data (e.g., audio, video, and marking data) can be additional to the slide data for each slide, as the slide data may also be considered as a form of multimedia data. For example, the presenter may insert, for any given slide, audio data to be played back or reproduced as audio during the presentation when the slide is being displayed during the presentation. The audio may comprise, for example, the presenter's own voice, a sound effect, music, narration, or the like. For example, an audio may include an audio portion of a move or clip, while a video may refer to the visual portion of the movie or clip. In some aspects, the presenter may set the start and end time for when the audio is to be played back during the presentation. The start and end time of the inserted audio (referred to herein as audio time information) need not coincide with the start and end time of the given slide. Similarly, for any given slide, the presenter may insert video data to be played back or reproduced as video when the slide is being displayed during the presentation. The video may comprise, one or more visual elements representing for example, any portion of a video of the presenter (e.g., while they are presenting the slide), a movie or television serial clip, a cartoon clip, an animation, a video recording, or the like. In some aspects, a video datum may comprises one or more visual data configured for reproducing the one or more visual elements of a video. The start and end time of the inserted video (referred to herein as audio time information) need not coincide with the start and end time of the given slide. Similarly, the presenter may choose to add marking data for any given slide. The marking may comprise any form of an annotation on the slide. In some aspects, the presenter may choose to specify a start and end time for the marking (referred to herein as marking time information), within the time window at which the slide is displayed, should a marking be displayed. In various embodiments, each multimedia data may be marked with slide information that indicates the slide with which the multimedia data is associated with. In some aspects, the slide information may be stored as metadata in the multimedia content. Furthermore, it is contemplated that not all slides need to have the additional multimedia data (e.g., audio, video, markings) associated with it, as a presenter may choose to present a given slide without any additional multimedia data accompanying it.

Generating Multimedia Data By Capturing From Live Or Recorded Presentation

In some embodiments, multimedia data may be generated by the presenter device or another computing device based on the capture of various multimedia data from a recorded or live presentation by the presenter (e.g., a ZOOM Presentation). Such embodiments may facilitate the real-time generation of multimedia data (e.g., from an ongoing, live, or recently recorded presentation) and real-time transmission of the presentation (e.g., to the audience device). For example, a presenter may deliver a presentation using the presentation document and may include various audio (e.g., including the voice of the presenter themselves), video, and/or marking. The presentation may be recorded or may otherwise be captured by the presenter device or another computing device. In such embodiments, multimedia data may be generated by capturing each instance of audio, video, and/or marking used during the presentation (e.g., via image, and/or audio processing), and storing them as audio, video, and/or marking data. The slide being displayed for each instance of the audio, video, and/or marking may be identified (e.g., via image recognition by comparing to slides of the presentation document), and the identification may be used to store slide information associating each audio, video, and/or marking with a respective slide. Furthermore, the times at which the audio, video, and/or markings are present during the presentation may be recorded and stored as time information for the respective multimedia data.

In some aspects, the presenter device and/or another computing device (e.g., a server) may detect slide changes during the presentation (e.g., when a given slide is replaced with another slide) to determine orders for slides and/or time intervals for each slide. For example, one or more image processors may recognize (e.g., based on predefined aspect ratios), a rectangular or quadrilateral area as comprising the slide, and may detect (e.g., based on a difference in a significant portion of the pixels within that area) a change in a slide from one time unit to the next time unit. In some aspect, a given multimedia datum, may be generated using a portion of any multimedia (e.g., an audio, a video, or a marking) that ends at or about the slide change. Thus, another multimedia datum may be generated using a second portion of the multimedia that starts at or about the of the slide change. In some embodiments, the presenter device and/or another computing device may also detect additions of video and/or markings (e.g., by detecting changes in pixels within a smaller portion of a slide). In some aspects, the presenter device and/or another device may detect the slide change and create the multimedia datum based on the slide change while the presentation is being performed by the presenter (e.g., the multimedia data generation may occur in real or near real time). In some aspects, the slide change may be detected based on an input by the presenter (e.g., a selection to proceed to the next slide on a slide creating application (e.g., Microsoft PowerPoint). Also or alternatively, the slide change may be detected by monitoring the displayed slides while the presentation is being performed.

Marking Datum

In embodiments, a computing system tracks movement of a presentation pointer, a writing device, or a hand-held pointing device that the presenter uses for a presentation slide, and stores data of the movement in a way that another computing device can reproduce the movement when reproducing presentation of the slide. For example, data of marking 2-1 (230) may i may be stored using a video format, a animation clip, pointer movement vector(s), location(s) of the pointer with time information, location(s) of the pointer measured with a predetermined frequency, and combination thereof. A data other than the exampler can be used for a marking datum.

Transmitting a Given Slide and Associated Multimedia Data to an Audience Device

Figure 4:
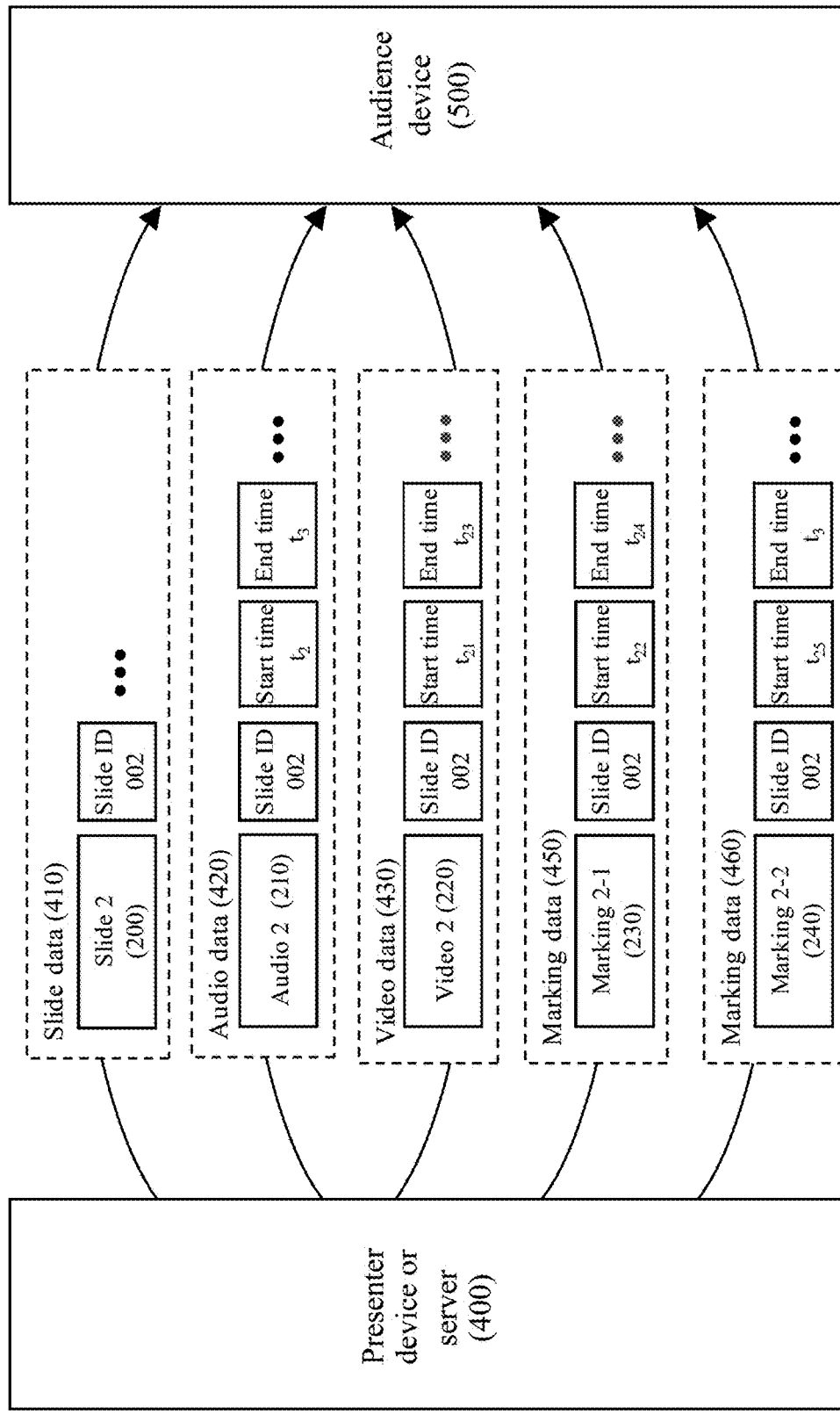
FIG. 4 is a block diagram illustrating the generation and transmission of multimedia contents for a presentation from a server to an audience device for reproduction thereon, according to an example embodiment of the present disclosure.

At step S310, a given slide of the plurality of slides may be transmitted to an audience device. Referring to FIG. 4, for example, a slide datum (410) including Slide 2 (200) and its Slide ID 002 is transmitted to the second computing device (500) Furthermore, at step S320, any multimedia data associated with the slide may also be transmitted to the audience device. Referring to FIG. 4, for example, the multimedia data (420-460) may be transmitted to the second computing device (500) for further processing to reproduce the presentation. The audience device may refer to the computing device associated with an intended audience or intended recipient of the presentation. In some aspects, the presenter device or a server may transmit, and the audience device may receive, the given slide before any corresponding multimedia data associated with the slide. In other aspects, the given slide need not be transmitted before the corresponding multimedia data. In some embodiments the datum corresponding to the given slide and/or any associated multimedia datum may be further fragmented into chunks. The chunks may be transmitted by the presenter device or server, and received by the audience device, separately to be reassembled into data for the given slide into the associated multimedia data. The chunks may facilitate more effective transmission over the communication network between the presenter device or server and the audience device, e.g., via adaptively loading a varying number of chunks into carriers depending on the network connectivity.

Reproducing Each Slide and Associated Multimedia Data by the Audience Device For each slide and any associated multimedia data received by the audience device, the audience device, at step 400, may combine the slide and multimedia data to reproduce the presentation for the slide on the audience device. For example, the audience device may detect slide information (e.g., stored as metadata) from a received multimedia data and may use the slide information to associate the received multimedia data with the slide referenced in the slide information. Furthermore, the audience device may use time information (e.g., an audio, video, or marking time information) to determine the start and end time for the multimedia data to be played back, relative to the start and end time of the slide with which the multimedia data is associated with. Steps S310, S320, and S400 may be repeated for other slides of the plurality of slides for the presentation, until all or most of the slides and multimedia data are combined. Thus, the audience device may synchronize playing of each multimedia datum with the display of the corresponding slides based on the slide information of the multimedia datum such that the slide appears on a screen of the audience device or another device as the multimedia datum starts to be played back. In some embodiments, reproducing any aspect of the presentation, for example, reproducing a given slide or multimedia data associated with the slide, may involve loading that aspect of the presentation on a viewing computer program installed in the audience device. In some aspects, a given slide may be loaded into the computer program before any associated multimedia data is loaded. The viewing computer program, when executed (e.g., by one or more processors of the audience device), may cause the audience device to play back the slide and multimedia (e.g., audio, video, or marking) corresponding to any multimedia data associated with the slide (e.g., audio data, video data, or marking data, respectively), in accordance with the time information for the multimedia data.

Transmitting Slide Data and Multimedia Data

As previously discussed, the systems and methods described herein for distributing multimedia contents for a presentation may overcome the issues of audience devices unable to receive or load large sizes for presentation files or separate presentations into their respective components. In some embodiments, the separate transmission of the various multimedia data and the slide data help to overcome these issues. FIG. 4 is a block diagram illustrating the transmission of multimedia contents for a presentation from a server to an audience device for reproduction thereon, according to an example embodiment of the present disclosure. As shown in FIG. 4, a first computing device 400 (e.g., a presenter device or another computing system (e.g., a server)) transmits various components of a presentation to a second computing device 500 (e.g., an audience device). A set of components being transmitted in any given time interval for transmission (referred to herein as transmission interval), may pertain to components of a presentation during a specific time interval of the presentation (referred to herein as presentation interval). In some aspects, the length of each presentation interval and/or each transmission interval may be correspond to the length of time allotted for the presentation of each slide for the plurality of slides of a presentation document. In the example previously described in relation to FIG. 2A, during a presentation interval from $t_1$ to $t_2$, which corresponded to the presentation of Slide 1 (100) the components of the presentation were only Slide 1 (100) and Audio 1 (110). The components being transmitted in transmission interval of FIG. 4, however, are of the presentation interval from $t_2$ to $t_3$ in the presentation timeline FIG. 2A, which corresponds to the presentation of slide 2 (200). As previously described in relation to FIG. 2A, the components being presented at any point within the presentation interval from $t_2$ to $t_3$ included slide 2 (200), Audio 2 (210), Video 2 (220), marking 2-1 (230), and marking 2-2 (240). Accordingly, in the transmission interval shown in FIG. 4, the presenter device 400 transmits: slide data (410) based on slide 2 (200), audio data (420) based on Audio 2 (210), video data (430) based on Video 2 (220), marking data (450) based on marking 2-1 (230), and marking data (460) based on marking 2-2 (240).

However, although these multimedia data are shown in FIG. 4 as being transmitted during a transmission interval, each multimedia data (e.g., audio data (420), video data (430), marking data (450), and marking data (460)) may be individually transmitted, such that the transmission of one datum need not coincide, wait, or be sent together with another datum. Furthermore, the various multimedia data may not be combined or integrated with other multimedia data, at least for the transmission. In embodiments, two or more of the Slide 2's multimedia data (420-460) are combined for transmission to the second computing device 500. In embodiments, one or more of the Slide 2's multimedia data (420-460) can be transmitted to the the second computing device 500 while another of the Slide 2's multimedia data is being transmitted to the the second computing device 500. In some embodiments, the multimedia data pertaining to an aspect of the presentation document itself for the given transmission interval, for example, slide data (410), may be transmitted to the second computing device 500 (e.g., audience device) before any additional multimedia data associated with the presentation is transmitted.

Selective Transmission of Multimedia Data Based on Network Bandwidth

In embodiments, some of the multimedia data of the slide may not be sent to the second computing device 500 when a current network bandwidth (or communication speed) between the first computing device 400 and the second computing device 500 is not enough. For example, the first computing device 400 obtains or measures a bandwidth of communication to the second computing device 500, determines that an undesirable pause or waiting is expected if the second computing device 500 waits for the video data 430, selects one or more elements of the multimedia data (excluding the video data 430) considering required bandwidth (or predetermined priority) of each element, transmits only the selected element(s) to the second computing device 500, and instruct the second computing device 500 to reproduce the presentation for the corresponding slide (Slide ID 002) without waiting for the video data 430 or any additional multimedia data. For example, the first computing device 400 may send, to the second computing device 500, a communication that video data 430 will not be sent and/or a list of multimedia data excluding video data 430 such that the second computing device 500 start to reproduce the presentation using Slide 2 without waiting for the video data 430. In embodiments, one or more factors other than network bandwidth can be considered for selective transmission of the multimedia data.

Tramismitting Slide Data and Multimedia Data Rather Than Combined Video

In embodiments, the audience device 500 does not receive (or require) a video file or stream in which one or more of the multimedia data are combine or integrated with its corresponding slide. Rather, the audience device 500 may receive the slide data (410) and one or more of the multimedia data (420-460) separately and then initiate a processing to reproduce the presentation for Slide 2 (200) using the received data. As there is no transmission of a combined video or stream, transmission of slide data (S310) and transmission of multimedia data (S320) may be separate and independent, and also selective transmission of the multimedia data is possible.

Multimedia Data can be Used to Identify Reproduce and/or Output the Respective Multimedia Content Each multimedia datum (e.g., audio datum, video datum, marking datum, etc.) comprises computer-executable instructions for reproducing and/or outputting a respective multimedia content (slide, audio video, and/or marking) and integrating the respective multimedia content with respect to other multimedia content (e.g., via time information). For example, audio data (420) includes time information for audio 2 (210), the time information indicated as the start time $t_2$ and the end time $t_3$. Video data (430) includes time information for video 2 (220), the time information indicated as the start time $t_{21}$ and the end time $t_{23}$. Marking data (450) includes time information for marking 2-1 (230), the time information indicated as the start time $t_{22}$ and the end time $t_{24}$. Marking data (460) includes time information for marking 2-2 (240), the time information indicated as the start time $t_{25}$ and the end time $t_3$. The time information (e.g., audio time information, video time information, or marking time information) may be indicative of a time at which the respective multimedia data, datum, and/or chunk is to be played back in the second computing device 500 (e.g., audience device). In some aspects, a given multimedia data need not include all or part of the time information when the start and end time is identical to the start and end time of the slide with which the multimedia data is associated with. For example, audio 2 (210) starts and ends at the same time as slide 2 (200) starts and ends, so audio data (410) need not include the time information. In such aspects, an absence of the time information may be indicative that the multimedia is to be played back through the entirety of the presentation interval for the associated slide (e.g., slide 2 (200)). By eliminating such redundant information and/or information that can be easily determined, the systems and methods described herein reduce the bandwidth sizes required for transmitting multimedia content for presentations.

Multimedia Data can be Used to Identify Associations

Furthermore, each multimedia datum (e.g., slide datum, audio datum, video datum, marking datum, etc.) comprises computer-executable instructions for associating the respective multimedia content (e.g., the audio, video, or marking) with a slide and/or slide number of the presentation. For example, slide data (410) further include slide identification (ID) 002 indicating the order of slide 2 (200). Similarly, audio data (420), video data (430), marking data (450), and marking data (460) each contain slide information for their respective multimedia (e.g., audio 2 (210), video 2 (220), marking 2-1 (230), and marking 2-3 (240), the slide information associating each of the multimedia to Slide 2 (200) (e.g., via Slide ID 002). Thus, by segmenting the presentation into components (e.g., presentation documents, audio data, video data, markings, etc.), segmenting each component into pieces (e.g., based on presentation intervals based on when each slide is being presented), and supplying time information and slide information for each piece, the first computing device 400 (e.g., a presenter device or a server) facilitates an effective integration and reproduction of the presentation at the second computing device 500 (e.g., an audience device).

Multimedia Content Associated with Two or More Slides

It is also contemplated that various multimedia content, or their corresponding multimedia data, may be associated with more than one slide. For example, a given audio or video may be played while two or more slides of a presentation document is being displayed. In some embodiments, the multimedia content associated with more than one slide may be split in two (e.g., at a time point that coincides with a detected slide change), resulting in two multimedia content. Also or alternatively, in some embodiment, a different type of multimedia data (in lieu of the slide data) may be used as controlling and deciding the presentation intervals for the presentation. In such embodiments, rather than slide information for each multimedia data, there may be information associating each multimedia data to the said different multimedia data that controls and decides the presentation intervals. For example, if a presentation includes periods where slides are not shown, but there is still audio throughout the presentation, audio data may be used for the controlling multimedia data for setting presentation intervals, and to which other multimedia data may be associated with.

Example Display of Audience Device Showing Presentation

Figure 5:
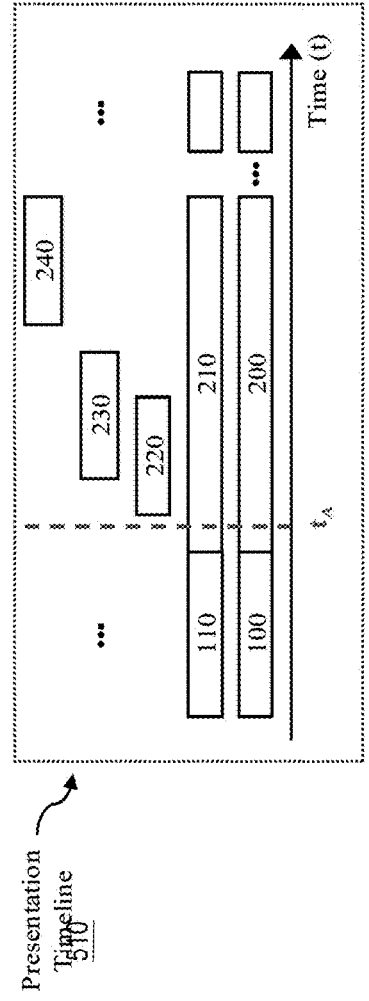
FIG. 5 illustrates an example display of an audience device showing a presentation, according to an example embodiment of the present disclosure.

As the various components and pieces of the presentation are transmitted to and received by the audience device, the audience device may load, synchronize, and play back the various components and pieces of the presentation. FIG. 5 illustrates an example display 500 of an audience device showing a presentation, according to an example embodiment of the present disclosure. In the example shown in FIG. 5, the audience device is playing back the presentation at a time point, $t_A$, when slide 2 (200) is being displayed, and audio 2 (210) is being played, as shown in the presentation timeline 510. The presentation timeline 510 shows that during time point $t_A$, the presenter has already finished presenting slide 1 (100), which had been displayed simultaneously with the playing back of audio 1 (110). However, the presentation timeline 510 also shows that the audience device will, after a short time, begin playing back video 2 (220) and presenting markings 2-1 (230). The presentation timeline 510 also shows that the audience device will, after a longer time, present marking 2-3 (240). The short time after $t_N$ will be a time point $t_B$ of the presentation, as shown in FIG. 6, while the longer time after $t_N$ will be a time point $t_C$ of the presentation, as shown in FIG. 7.

Figure 6:
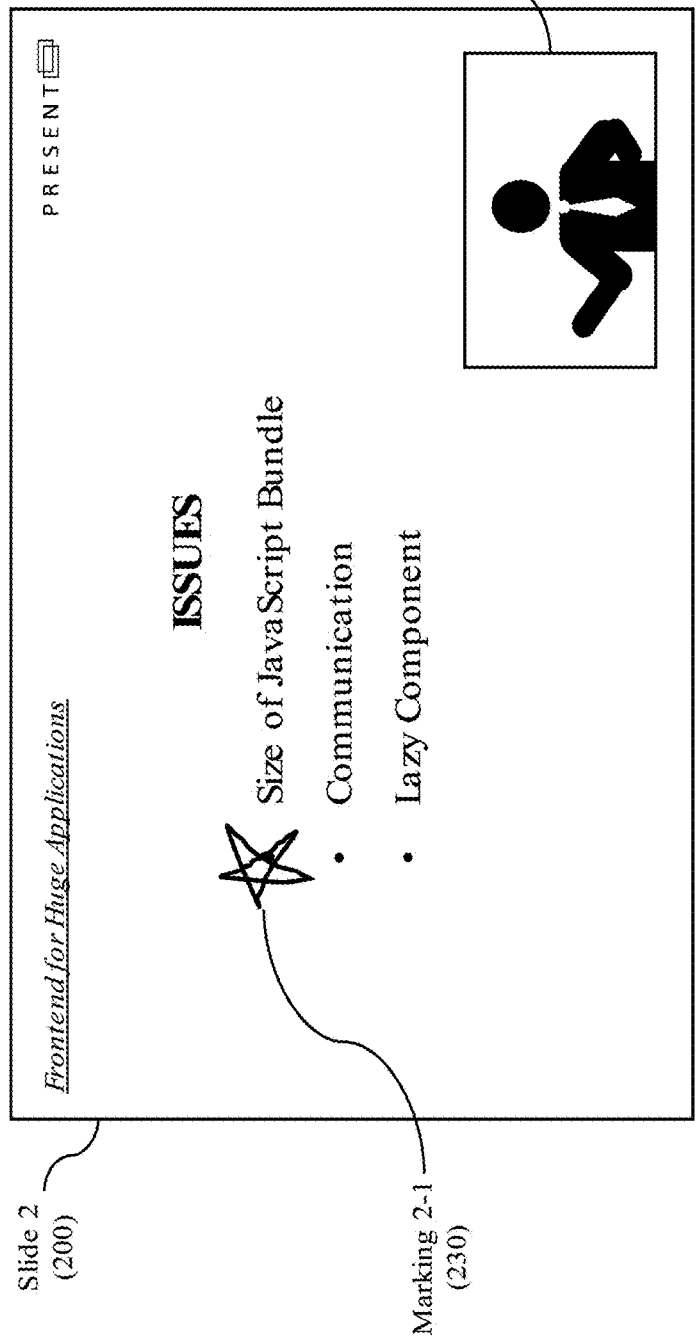
FIG. 6 illustrates an example display of an audience device showing a presentation with additional multimedia content, according to an example embodiment of the present disclosure.
Figure 6:
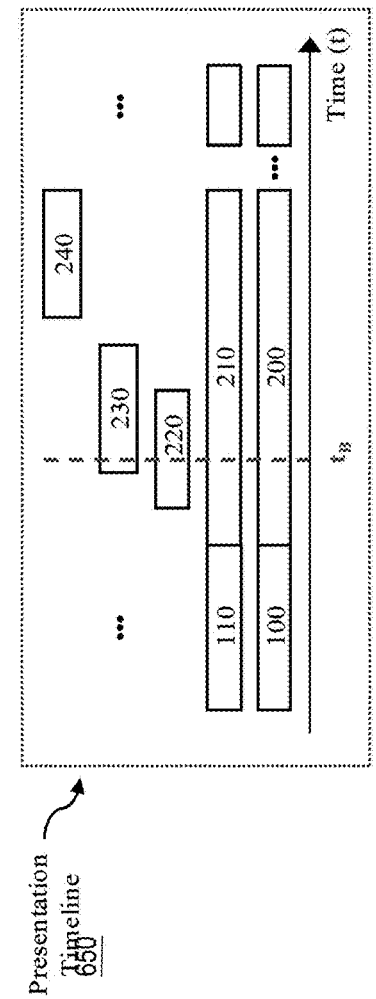

Example Display of Audience Device Showing Presentation With Additional Multimedia Content FIG. 6 illustrates an example display of an audience device showing the presentation at another time point, and with additional multimedia content, according to an example embodiment of the present disclosure. Specifically, the display shown in FIG. 6 is of the presentation at time point $t_B$, which occurs later in the presentation timeline from $t_A$ of FIG. 5. The additional multimedia content shown in the display in FIG. 6, which is not shown in FIG. 5, is video 2 (220) and marking 2-1 (230), which is presented during time point $t_B$ but are not presented at time point $t_A$. The additional multimedia content nevertheless is associated with slide 2 (200) based on the slide information of the multimedia data for the additional multimedia content (e.g., video data (430) for video 2 (220) and marking data (450) for marking 2-1 (230)), as previously discussed in relation to FIG. 4. Thus, the additional multimedia content is being played while slide 2 (200) is being displayed. Furthermore, as slide 2 (200) and audio 2 (210) share the same start and end time, as shown in the presentation timeline 650, audio 2 is being played is being played while slide 2 (200) is displayed. As shown in FIG. 6, video 2 (220) is a recording of the presenter as they are presenting. Furthermore, marking 2-1 (230) is shown to be an annotation by the presenter where the first bullet point of slide 2 (200) is starred for emphasis. However, it is contemplated that the presenter can generate a marking using any form of annotation, including free form (e.g., simply using the pen tool to draw or write notes on the slide), shapes, textual emphases (e.g., bold, italics, underline), or the like.

Figure 7:
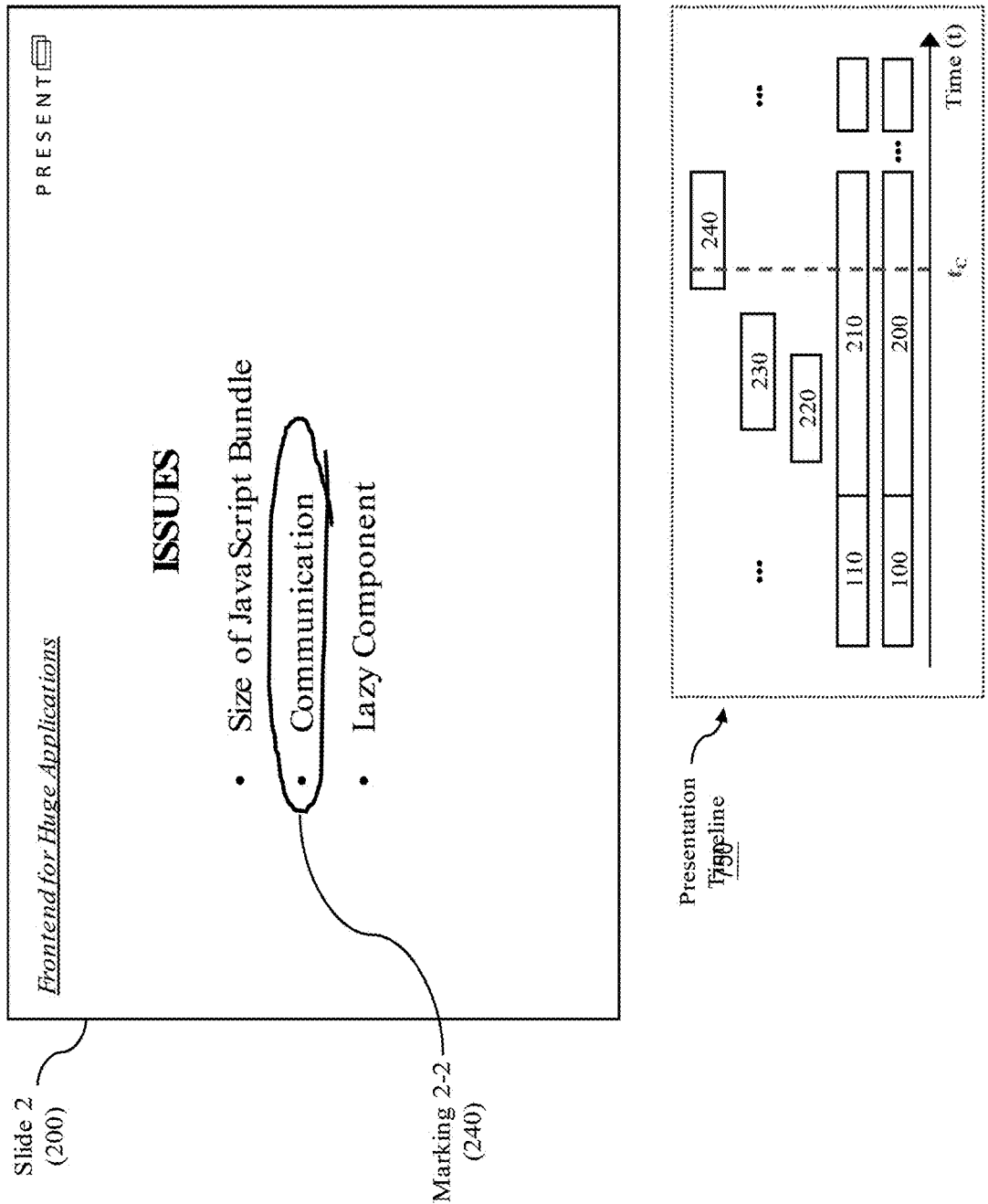
FIG. 7 illustrates an example display of an audience device showing a presentation with additional multimedia content, according to another example embodiment of the present disclosure.

FIG. 7 illustrates an example display of an audience device showing the presentation at yet another time point with additional multimedia content, according to another example embodiment of the present disclosure. Specifically, the time point for the presentation shown in FIG. 7 is time point $t_C$, which is later than the time point $t_B$ of the presentation shown in FIG. 6, which is later than the time point $t_A$ of the presentation shown in FIG. 5. The additional multimedia content shown in the display in FIG. 7, which is not shown in FIG. 5 or 6, is marking 2-2 (240), which is presented during time point $t_C$ but is not presented at time points $t_A$ or $t_B$. Furthermore, at time point $t_C$, video 2 (220) is no longer being played and marking 2-1 (230) is no longer being displayed. Nevertheless, marking 2-2 (240) is associated with slide 2 (200) based on the slide information of marking data (460) for marking 2-2 (240)) indicating slide ID 002, as previously discussed in relation to FIG. 4. Thus, marking 2-2 (240) is being displayed while slide 2 (200) is being displayed. Furthermore, as slide 2 (200) and audio 2 (210) share the same start and end time, as shown in the presentation timeline 750, audio 2 is being played is being played while slide 2 (200) is displayed. As shown in FIG. 7, marking 2-2 (240) is shown to be an annotation by the presenter where the second bullet point of slide 2 (200) is starred for emphasis. However, it is contemplated that the presenter can generate a marking using any form of annotation, including free form (e.g., simply using the pen tool to draw or write notes on the slide), shapes, textual emphases (e.g., bold, italics, underline), or the like. In some embodiments, for example, where a marking is a free form drawing, the marking data may include one or more of a thickness (e.g., line size) of the drawing, a color of the drawing, a texture of the drawing, a shade of the drawing, or the like.

Integration And Synchronization Of A Presentation

Figure 8:
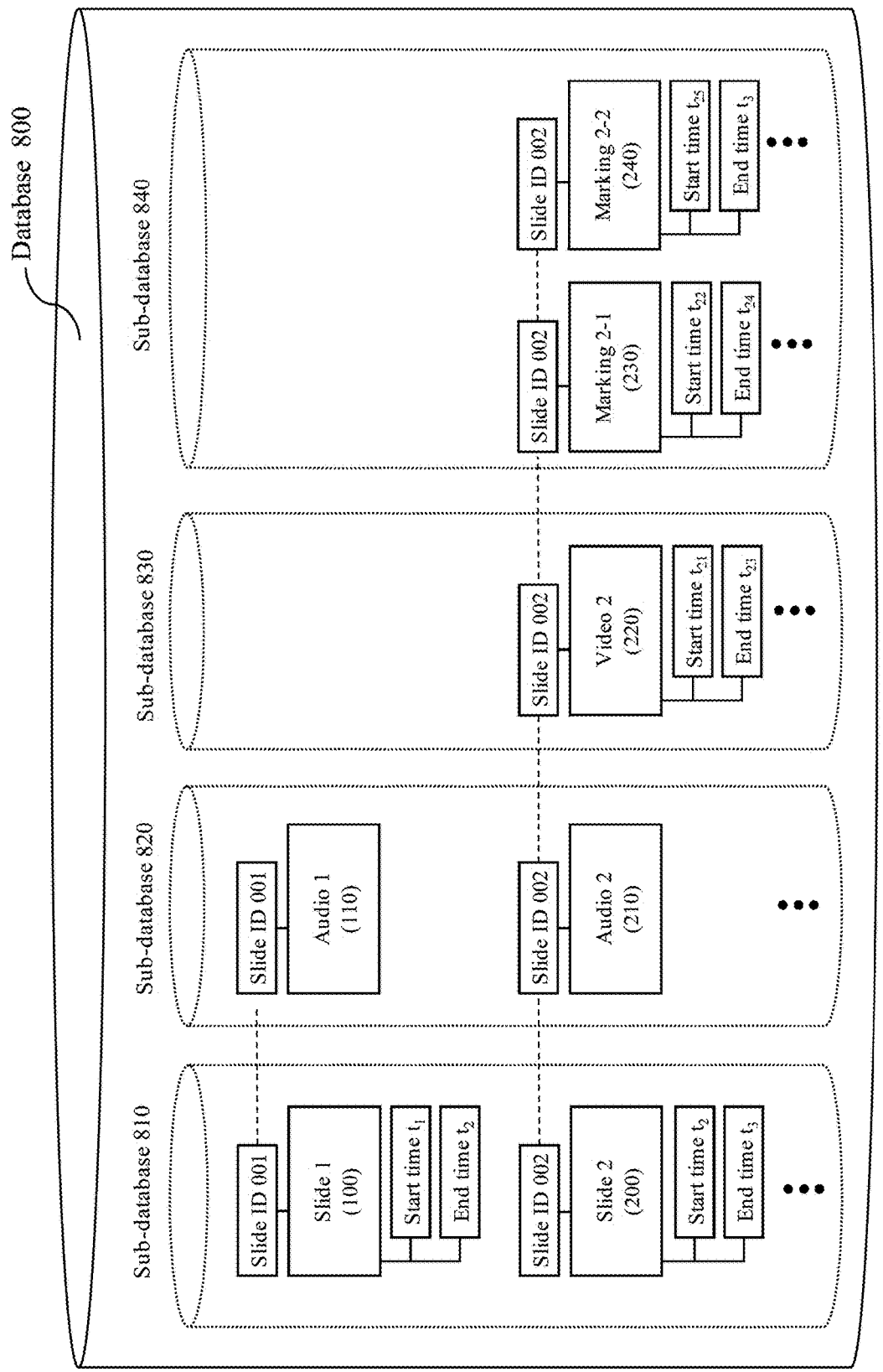
FIG. 8 is a block diagram illustrating an example database of a computing device for integrating and synchronizing multimedia data for a presentation, according to an example embodiment of the present disclosure.

The foregoing embodiments described above also allow the integration and synchronization of the presentation at the audience device or another computing device. As the audience device receives individual components and pieces of the presentation (e.g., via separate transmissions), the audience device may store the pieces and components in data structures that facilitate integration and synchronization. FIG. 8 is a block diagram illustrating an example database 800 of a computing device that is integrating and synchronizing multimedia data for a presentation, according to an example embodiment of the present disclosure. As shown in the FIG. 8, the database 800 may include a plurality of sub-databases for compartmentalizing multimedia data storage. In this example, sub-database 810 may be used to store slide data, sub-database 820 may be used to store audio data, sub-database 830 may be used to store video data, and sub-database 840 may be used to store marking data. In some embodiments, each sub-database may comprise a data structure that is customized to be able to store the respective form of multimedia data (e.g., slide audio, video, or marking data). Furthermore, as was described previously, since components and/or pieces of the presentation may be transmitted to the audience device separately, for example, in discrete transmission intervals, the audience device may store the components and/or pieces into the database 800 as they are received. For example, as the audience device receives multimedia data pertaining to the first presentation interval (e.g., from time $t_1$ to $t_2$ of the presentation timeline), the received multimedia data (e.g., slide 1 (100), and audio 1 (110)) may be stored in their respective sub-databases in a manner where the stored multimedia data is linked or otherwise associated with one another for belonging to the same presentation interval. As the audience device receives multimedia data pertaining to each subsequent presentation interval (e.g., from time $t_2$ to $t_3$ of the presentation timeline), the received multimedia data (e.g., slide 2 (200), audio 2 (210), video 2 (220), marking 2-1 (230), marking 2-2 (240)) may be stored in their respective sub-databases in a manner where the stored multimedia data is linked or otherwise associated with one another for belonging to the same subsequent presentation interval (e.g., the second presentation interval).

Identifying Associations of Data Entries in the Database

As previously discussed, presentation intervals may be based on the times allotted to each slide in a presentation. Thus, in at least one embodiment, multimedia data for multimedia to content to be played back within the same presentation interval may be associated with one another based on their slide information. In this example, multimedia data for two multimedia —slide 1 (100) and audio 1 (110)—are associated to one another based on the slide information—Slide ID 001—linking both multimedia to slide 1 of the presentation. Similarly, multimedia data for slide 2 (200), audio 2 (210), video 2 (220), marking 2-1 (230), and marking 2-2 (240)—are associated with one another based on the slide information—Slide ID 002— linking each multimedia to slide 2 of the presentation. The associations of various database entries for such multimedia data are shown in FIG. 8, for example, through dashed lines across the same row of stored multimedia data. Furthermore, the time information for a given multimedia data may also be stored within the sub-database entry. However, as previously discussed, time information for a multimedia data (e.g., multimedia data for audio 1 (110) and audio 2 (210)) need not be stored if the start and end times for that multimedia data is the same as the presentation interval (e.g., the start and end time for the slide with which the multimedia data is associated with).

Reproducing the Presentation Using the Example Database

The entry of multimedia data for a presentation into the data structures of database 800, as shown in FIG. 8, allows the audience device or another computing device to efficiently reproduce the presentation. For example, the audience device may identify a sub-database (e.g., sub-database 810) as being controlling for the purposes of the presentation, for example, because the multimedia data stored in that sub-database (e.g., the slides of the presentation document) sets the presentation intervals and/or because other multimedia data form an association with the multimedia data. While the example described in FIG. 8 use slide data as the controlling multimedia data, this need not be so and it is contemplated that other multimedia data may be used (e.g., video segments, audio segments, etc.). After the sub-database storing the controlling multimedia data (e.g., the presentation document) is identified, the audience device may load the stored multimedia data for a first presentation interval. In this example, the first presentation interval may be identified by the slide information designating a slide as the first slide (e.g., slide ID 001) and/or by the time information indicating a slide as having the start time $t_1$. Next, other multimedia data (audio 1 (110) associated with the controlling multimedia (e.g., slide 1 (100)) may be identified and loaded. In the data structure shown in the database 800, the other multimedia data may be identified based on their associations (as shown via the dashed line and placement along the same row). After the multimedia data for one presentation interval are loaded, the audience device may proceed with performing substantially similar or same steps with the next presentation interval (e.g., corresponding the next slide). In the event where other associated multimedia data, despite having associations with the same controlling multimedia (e.g., the slide), have different time information, multimedia data having earlier start times may be loaded first. For example, video 2 (220) may be loaded before marking 2-1 (230), since video 2 (220) has an earlier start time, even though video 2 (220) and marking 2-1 are both associated with one another based on their occurrence within the same presentation interval of slide 2 (200). Thus, the audience device may efficiently store, synthesize, integrate, and/or reproduce a presentation from individual components and pieces of the presentation, thus overcoming the issues of size and bandwidth in conventional presentation distributions between computing devices.

Computing Devices and Systems that May Use the Example Database

Furthermore, while the example database 800 is described as being used by the audience device for synthesizing the presentation, the example database 800 may also or alternatively be used by other computing devices, such as the presenter device or another computing system (e.g., a server). For example, in embodiments where the presenter device is used to generate multimedia data from a live or recorded presentation (e.g., a ZOOM call) for a distribution or redistribution of the presentation to an audience device for reproduction thereon, the presenter device may employ the database 800 and the techniques for data storage thus described for storing the multimedia data of the presentation. For example, the presentation device may detect slide changes from the live or recorded presentation to determine presentation intervals, store captured slides (e.g., through image capture), and store multimedia data corresponding to captured audio, video, and/or markings, including associations between multimedia data, according to the techniques thus described. Also or alternatively, a server may receive a presentation performed by the presenter using the presenter device, and the server may use the techniques of slide and other multimedia (e.g., video, audio, marking) detection and capture to determine presentation intervals, store captured slides (e.g., through image capture), and store multimedia data corresponding to captured audio, video, and/or markings, including associations between multimedia data, according to the techniques thus described. The server may cause or facilitate the transmission of, and/or directly transmit, the pieces and components of the presentation, along with the slide information and the time information for the pieces and components, to the audience device.

Computing Device

Figure 9:
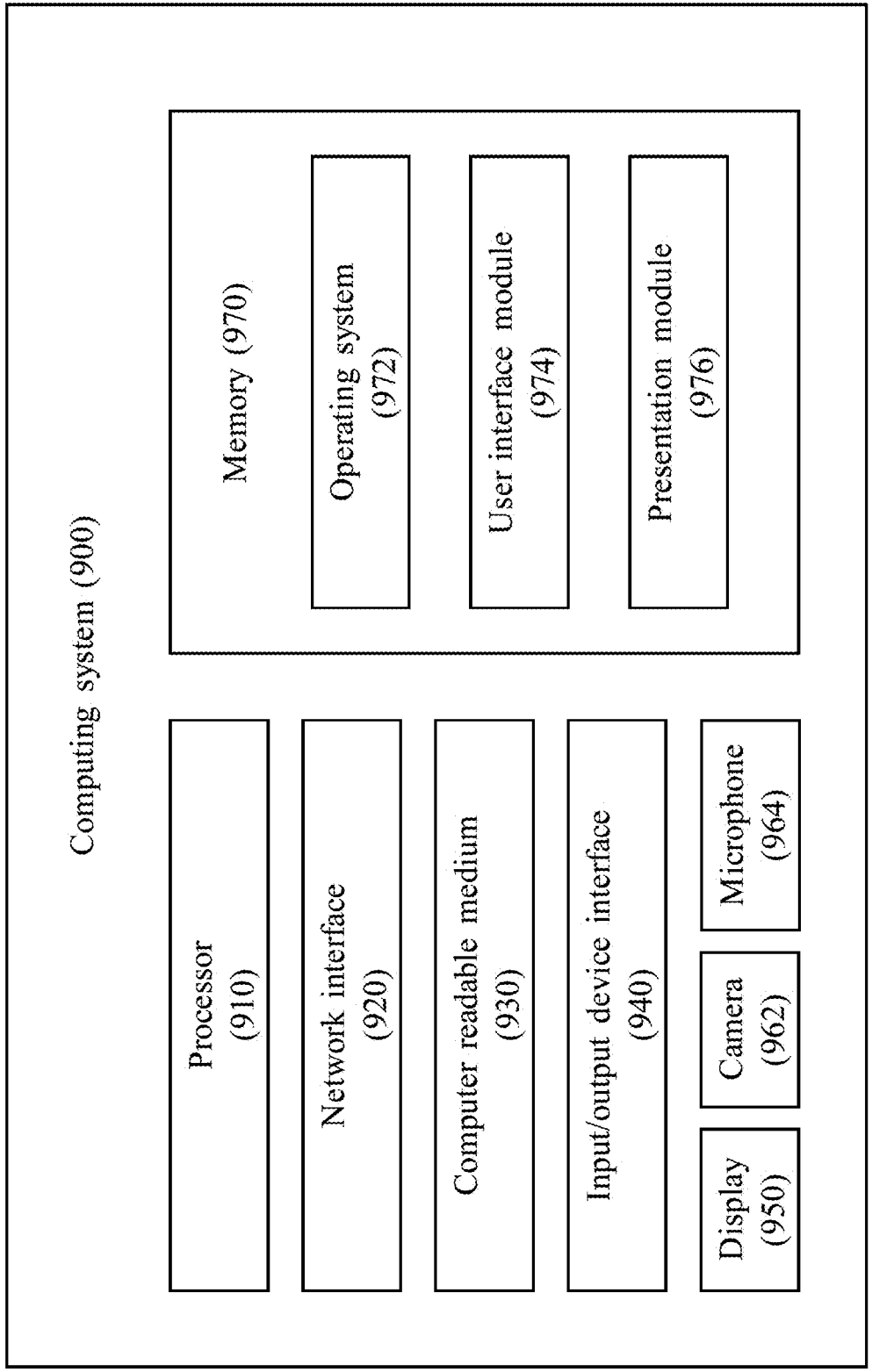
FIG. 9 is a block diagram illustrating an example computing system used for generating, transmitting, reproducing, and/or integrating multimedia contents for a presentation, according to an example embodiment of the present disclosure.

FIG. 9 is a block diagram illustrating an example computing system used for generating, transmitting, reproducing, and/or integrating multimedia contents for a presentation, according to an example embodiment of the present disclosure. The example computing system may be an example computing device used by the presenter device, the audience device, and/or another computing device used for generating, transmitting, reproducing, and/or integrating multimedia contents for the presentation. For example, the computing system 900 may comprise may comprise a stand-alone or portable computing device (e.g., a mobile device, personal digital assistant, laptop, tablet computers, desktop, etc.) having one or more of the subcomponents described herein for allowing a user (e.g., a presenter, an educator, a professional, an audience, a student, a client, etc.) to present, generate a presentation, transmit or receive the presentation, integrate or reproduce the presentation, and/or view the presentation. As shown in FIG. 9, the computing system 900 may include, but is not limited to, one or more of a processor 910, a network interface 920, a computer readable medium 930, an input/output device interface 940, a display 950, a camera 962, a microphone 964, and memory 970. Furthermore the memory 970 may comprise, and/or store computer-executable or machine readable instructions to run or execute, one or more of an operating system 972, a user interface module 974, and a presentation module 976.

The processor 910 may comprise any one or more types of digital circuit configured to perform operations on a data stream, including functions described in the present disclosure. The network interface 920 may allow the computing system (e.g., a presenter or audience device) to transmit data, receive data, and/or otherwise communicate with another computing system (e.g., an audience or a presenter device, respectively) over a communication network. For example, the respective network interface may comprise a wired interface (e.g., electrical, RF (via coax), optical interface (via fiber)), a wireless interface, a, modem, etc. The computer readable medium 930 may comprise a medium capable of storing various components or pieces of the presentation (e.g., multimedia datum) in a format readable by a computing device. Examples of machine-readable media include magnetic media such as magnetic disks, cards, tapes, and drums, punched cards and paper tapes, optical discs, barcodes and magnetic ink characters. For example, in the process of creating and/or generating a presentation, a presenter may load additional multimedia content (e.g., audio and/or video files) for certain slides of a presentation document using the computer readable medium 930. The input/output device interface 940 may comprise a hardware or logic that transfers information between internal storage devices (e.g., memory 970, computer readable medium 930) and an external peripheral device (e.g., display 950, camera 962). For example, an audience device may load various components of a presentation (e.g., slide data, audio data, video data, and/or marking data for a given presentation interval) from a database (e.g., database 800) stored in the memory 970 and output said components to the display 950 suing the input/output device interface 940. The display 950 may comprise any form of an output device for presenting various aspects of the presentation in a visual and/or tactile form. The camera 962 may comprise any form of optical instrument for capturing images, e.g., for generating video data, detecting slide changes, and/or generating marking data from a live or recorded presentation. The microphone 964 may comprise any form of sound recording instrument for capturing audio, e.g., for generating audio data from a live or recorded presentation.

The memory 970 may comprise any type of long term, short term, volatile, nonvolatile, or other memory and is not to be limited to any particular type of memory or number of memories, or type of media upon which memory is stored. The memory 970 may store instructions, programs, or programmable logic that, when executed or activated by the processor 910, can cause the computing system 900 to perform one or more methods discussed herein. For example, the operating system 927 may comprise one or more programs to coordinate the operations of hardware and software of the computing system 900 to perform methods described herein. The user interface module 974 may comprise one or more programs to coordinate user input for creating, generating, viewing, and/or interacting with presentations. Furthermore, the presentation module 976 may comprise a software and/or hardware component of the computing system 900 for generating, transmitting, reproducing, and/or integrating multimedia contents for the presentation according to techniques thus described. For example, the presentation module 976 may include computer executable instructions, programs, and/or programmable logic for storing multimedia content of a presentation to a database (e.g., database 800) that facilitates an effective integration of the presentation using, for example, associations between pieces of the presentation based on time information and slide information.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A method of processing a multimedia presentation, the method comprising:
providing a presentation document comprising a plurality of slides which comprises a first slide and a second slide;
generating multimedia data of a presentation performed by at least one presenter using the presentation document, wherein the multimedia data comprises a first audio datum, a first video datum, a second audio datum and a second video datum;
wherein the first audio datum is associated with the first slide and configured for reproducing a first audio captured while the first slide is displayed during the presentation, the first video datum is associated with the first slide and configured for reproducing a first video captured while the first slide is displayed during the presentation, the second audio datum is associated with the second slide and configured for reproducing a second audio captured while the second slide is displayed during the presentation, and the second video datum is associated with the second slide and configured for reproducing a second video captured while the second slide is displayed during the presentation; and
causing to transmit the multimedia data to an audience device for reproduction of the multimedia presentation such that:
each of the first audio datum, the first video datum, the second audio datum and the second video datum is individually transmitted to the audience device,
each of the first audio datum, the first video datum, the second audio datum and the second video datum is transmitted along with slide information indicative of one of the plurality of slides with which it is associated,
the first video datum, when transmitted, is not combined or integrated with the first slide,
the second video datum, when transmitted, is not combined or integrated with the second slide,
the first video datum is transmitted along with first video time information for playing back the first video datum, and
the second video datum is transmitted along with second video time information for playing back the second video datum.

2. The method of claim 1, further comprising:
causing to synchronize playing of the first audio datum and displaying of the first slide such that the first slide appears on a screen of the audience device or another device as the first audio datum starts to be played back; and
causing to synchronize playing of the second audio datum and displaying of the second slide such that the second slide appears on the screen as the second audio datum starts to be played back.

3. The method of claim 1, further comprising:
causing at least part of the plurality of slides comprising the first and second slides to be transmitted to the audience device prior to transmission of the multimedia data to the audience device;
causing to load the at least part of the plurality of slides on a viewing computer program installed in the audience device for viewing the at least part of the plurality of slides prior to receipt of the first audio datum by the audience device; and
causing to synchronize playing of the first audio datum and displaying of the first slide such that the first slide appears on a screen of the audience device or another device as the first audio datum starts to be played back.

4. The method of claim 1, wherein the second slide is immediately subsequent to the first slide in the presentation, wherein the method further comprises:
causing to transmit the first slide to the audience device; and
subsequently causing to transmit the second slide to the audience device,
wherein the first audio datum and the first video datum are transmitted to the audience device prior to transmission of the second slide.

5. The method of claim 1, wherein the second slide is immediately subsequent to the first slide in the presentation, wherein the second audio datum is transmitted to the audience device along with a second audio time information for playing back the second audio datum, wherein the second audio time information indicates a relative time with reference to transition from the first slide to the second slide.

6. The method of claim 5, wherein the method further comprises:
causing to synchronize playing of the first audio datum and displaying of the first slide such that the first slide appears on a screen of the audience device or another device as the first audio datum starts to be played back; and causing to synchronize playing of the second audio datum and displaying of the second slide such that the first slide is switched to the second slide on the screen as the second audio datum starts to be played back.

7. The method of claim 1, further comprising:
causing to start playing the first video datum at the time indicated by the first video time information while the first slide is being displayed on a screen such that a first video of the first video datum is displayed on the screen together with the first slide; and
causing to start playing the second video datum at the time indicated by the second video time information while the second slide is being displayed on the screen such that a second video of the second video datum is displayed on the screen together with the second slide.

8. The method of claim 7, wherein the first video datum comprises one or more first visual data configured for reproducing one or more visual elements of a video captured while the first slide is displayed during the presentation,
wherein the second video datum comprises one or more second visual data configured for reproducing one or more visual elements of a video captured while the second slide is displayed during the presentation,
wherein the multimedia data further comprises a first marking datum and a second marking datum,
wherein the first marking datum is associated with the first slide as containing at least one marking made on the first slide while the first slide is displayed during the presentation,
wherein the second marking datum is associated with the second slide as containing at least one marking made on the second slide while the second slide is displayed during the presentation.

9. The method of claim 8, wherein each of the first marking datum and the second marking datum is individually transmitted to the audience device,
wherein each of the first marking datum and the second marking datum is transmitted along with slide information indicative of one of the plurality of slides with which it is associated,
wherein the first marking datum, when transmitted, is not combined or integrated with the first slide,
wherein the second marking datum, when transmitted, is not combined or integrated with the second slide,
wherein the first marking datum is transmitted along with first marking time information indicative of a time at which the first marking datum is to be played back, and
wherein the second marking datum is transmitted along with second marking time information indicative of a time at which the second marking datum is to be played back.

10. The method of claim 1, wherein the first video datum is referred to as a first marking datum configured for reproducing at least one marking made on the first slide while the first slide is displayed during the presentation,
wherein the second video datum is referred to as a second marking datum configured for reproducing at least one marking made on the second slide while the second slide is displayed during the presentation,
wherein the first marking datum comprises location information indicative of a location of a marking on the first slide and a time associated with the location.

11. The method of claim 10, wherein the first marking datum further comprise thickness information indicative of a thickness of the marking and color information indicative of a color of the marking.

12. The method of claim 1, wherein generating the multimedia data comprises:
capturing an audio during the presentation, in which the first slide is displayed and subsequently the first slide is replaced with the second slide;
detecting a slide change in which the first slide is replaced with the second slide;
creating the first audio datum using a first portion of the audio that ends at the time of the slide change; and
creating the second audio datum using a second portion of the audio that starts at the time of the slide change.

13. The method of claim 12, wherein providing the audio comprises capturing the audio during the presentation,
wherein detecting the slide change and creating the first audio datum are performed while the presentation is being performed,
wherein the slide change is detected based on an input by the at least one presenter or based on monitoring of displayed slides while the presentation is being performed,
wherein the first audio datum is transmitted to the audience device by streaming while the presentation is being performed.

14. The method of claim 1, wherein generating the multimedia data comprises:
capturing an audio during the presentation, in which the first slide is displayed and subsequently the first slide is replaced with the second slide;
detecting an addition of the first video occurred while the first slide is displayed during the presentation;
creating the first video datum comprising the first video; and
further creating the first video time information indicative of a time at which the first video is added.

15. The method of claim 1, wherein generating the multimedia data comprises:
providing at least one recording of audio of the presentation, in which the first slide is displayed and subsequently the first slide is replaced with the second slide;
providing at least one recording of a visual representation of the presentation which comprises a sequence of at least part of the plurality of slides;
processing the visual representation of the presentation to detecting a slide change in which the first slide is replaced with the second slide;
determining a time of the slide change relative to a reference point in the audio of the presentation;
creating the first audio datum using a portion of the audio that ends at the time of the slide change; and
creating the second audio datum using a portion of the audio that starts at the time of the of the slide change.

16. A non-transitory computer readable medium storing instructions that, when executed by at least one processor, cause the at least one processor to:
receive, from a first computing device, a presentation document comprising a plurality of slides which comprises a first slide and a second slide;
generate multimedia data of a multimedia presentation performed by at least one presenter using the presentation document, wherein the multimedia data comprises a first audio datum, a first video datum, a second audio datum and a second video datum,
wherein the first audio datum is associated with the first slide and configured for reproducing a first audio captured while the first slide is displayed during the presentation, the first video datum is associated with the first slide and configured for reproducing a first video captured while the first slide is displayed during the multimedia presentation, the second audio datum is associated with the second slide and configured for reproducing a second audio captured while the second slide is displayed during the multimedia presentation, and the second video datum is associated with the second slide and configured for reproducing a second video captured while the second slide is displayed during the multimedia presentation; and cause transmission of the multimedia data to a second computing device for reproduction of the multimedia presentation such that:
- each of the first audio datum, the first video datum, the second audio datum and the second video datum is individually transmitted to the second computing device,
- each of the first audio datum, the first video datum, the second audio datum and the second video datum is transmitted along with slide information indicative of one of the plurality of slides with which it is associated,
- the first video datum, when transmitted, is not combined or integrated with the first slide,
- the second video datum, when transmitted, is not combined or integrated with the second slide,
- the first video datum is transmitted along with first video time information for playing back the first video datum, and
- the second video datum is transmitted along with second video time information for playing back the second video datum.

17. The non-transitory computer readable medium of claim 16, wherein the instructions, when executed, further cause the at least one processor to:
- cause the second computing device to synchronize playing of the first audio datum and displaying of the first slide such that the first slide appears on a screen of the second computing device as the first audio datum starts to be played back; and
- cause the second computing device to synchronize playing of the second audio datum and displaying of the second slide such that the second slide appears on the screen as the second audio datum starts to be played back.

18. The non-transitory computer readable medium of claim 16, wherein the instructions, when executed, further cause the at least one processor to:
- cause at least part of the plurality of slides comprising the first and second slides to be transmitted to the second computing device prior to transmission of the multimedia data to the second computing device;
- cause the second computing device to load the at least part of the plurality of slides on a viewing computer program installed in the second computing device for viewing the at least part of the plurality of slides prior to receipt of the first audio datum by the second computing device; and
- cause the second computing device to synchronize playing of the first audio datum and displaying of the first slide such that the first slide appears on a screen of the second computing device as the first audio datum starts to be played back.

19. The non-transitory computer readable medium of claim 16, wherein the second slide is immediately subsequent to the first slide in the multimedia presentation, wherein the instructions, when executed, further cause the at least one processor to:
- cause transmission of the first slide to the second computing device; and
- subsequently cause transmission of the second slide to the second computing device,
- wherein the first audio datum and the first video datum are transmitted to the second computing device prior to transmission of the second slide.

20. The non-transitory computer readable medium of claim 16, wherein the second slide is immediately subsequent to the first slide in the multimedia presentation, wherein the second audio datum is transmitted to the second computing device along with a second audio time information indicative of a time at which the second audio datum is to be played back, wherein the time indicated by the second audio time information is at a time at which playing of the first audio datum is completed.

* * * * *